US007870574B2

(12) United States Patent
Kenyon et al.

(10) Patent No.: US 7,870,574 B2
(45) Date of Patent: *Jan. 11, 2011

(54) METHOD AND APPARATUS FOR AUTOMATICALLY RECOGNIZING INPUT AUDIO AND/OR VIDEO STREAMS

(75) Inventors: Stephen C. Kenyon, Fairfax, VA (US); Laura Simkins, Fairfax, VA (US)

(73) Assignee: Iceberg Industries, LLC

( * ) Notice: Subject to any disclaimer, the term of this patent is extended or adjusted under 35 U.S.C. 154(b) by 503 days.

This patent is subject to a terminal disclaimer.

(21) Appl. No.: 11/672,294

(22) Filed: Feb. 7, 2007

(65) Prior Publication Data

US 2007/0129952 A1   Jun. 7, 2007

Related U.S. Application Data

(63) Continuation of application No. 09/420,945, filed on Oct. 19, 1999, now Pat. No. 7,194,752.

(60) Provisional application No. 60/155,064, filed on Sep. 21, 1999.

(51) Int. Cl.
*H04N 7/173* (2006.01)
*G06F 9/00* (2006.01)
*H04N 5/228* (2006.01)
*H04N 9/74* (2006.01)
*G06K 9/78* (2006.01)

(52) U.S. Cl. ................. 725/19; 725/18; 725/22; 382/118; 382/192; 382/207

(58) Field of Classification Search ............ 725/19–21, 725/18, 22; 382/118, 119, 190–192, 207
See application file for complete search history.

(56) References Cited

U.S. PATENT DOCUMENTS

| 4,241,266 A * | 12/1980 | Orban ................. 327/309 |
| 4,843,562 A * | 6/1989 | Kenyon et al. ......... 702/73 |
| 5,572,246 A * | 11/1996 | Ellis et al. ............. 725/22 |
| 5,953,439 A * | 9/1999 | Ishihara et al. ........ 382/107 |
| 7,194,752 B1 * | 3/2007 | Kenyon et al. .......... 725/22 |

\* cited by examiner

*Primary Examiner*—Christopher Kelley
*Assistant Examiner*—Reuben M Brown
(74) *Attorney, Agent, or Firm*—Katten Muchin Rosenman LLP

(57) ABSTRACT

A method and system for the automatic identification of audio, video, multimedia, and/or data recordings based on immutable characteristics of these works. The invention does not require the insertion of identifying codes or signals into the recording. This allows the system to be used to identify existing recordings that have not been through a coding process at the time that they were generated. Instead, each work to be recognized is "played" into the system where it is subjected to an automatic signal analysis process that locates salient features and computes a statistical representation of these properties. These features are then stored as patterns for later recognition of live input signal streams. A different set of features is derived for each audio or video work to be identified and stored. During real-time monitoring of a signal stream, a similar automatic signal analysis process is carried out, and many features are computed for comparison with the patterns stored in a large feature database. For each particular pattern stored in the database, only the relevant characteristics are compared with the real-time feature set. Preferably, during analysis and generation of reference patterns, data are extracted from all time intervals of a recording. This allows a work to be recognized from a single sample taken from any part of the recording.

17 Claims, 18 Drawing Sheets

Multiple Feature Correlation Process

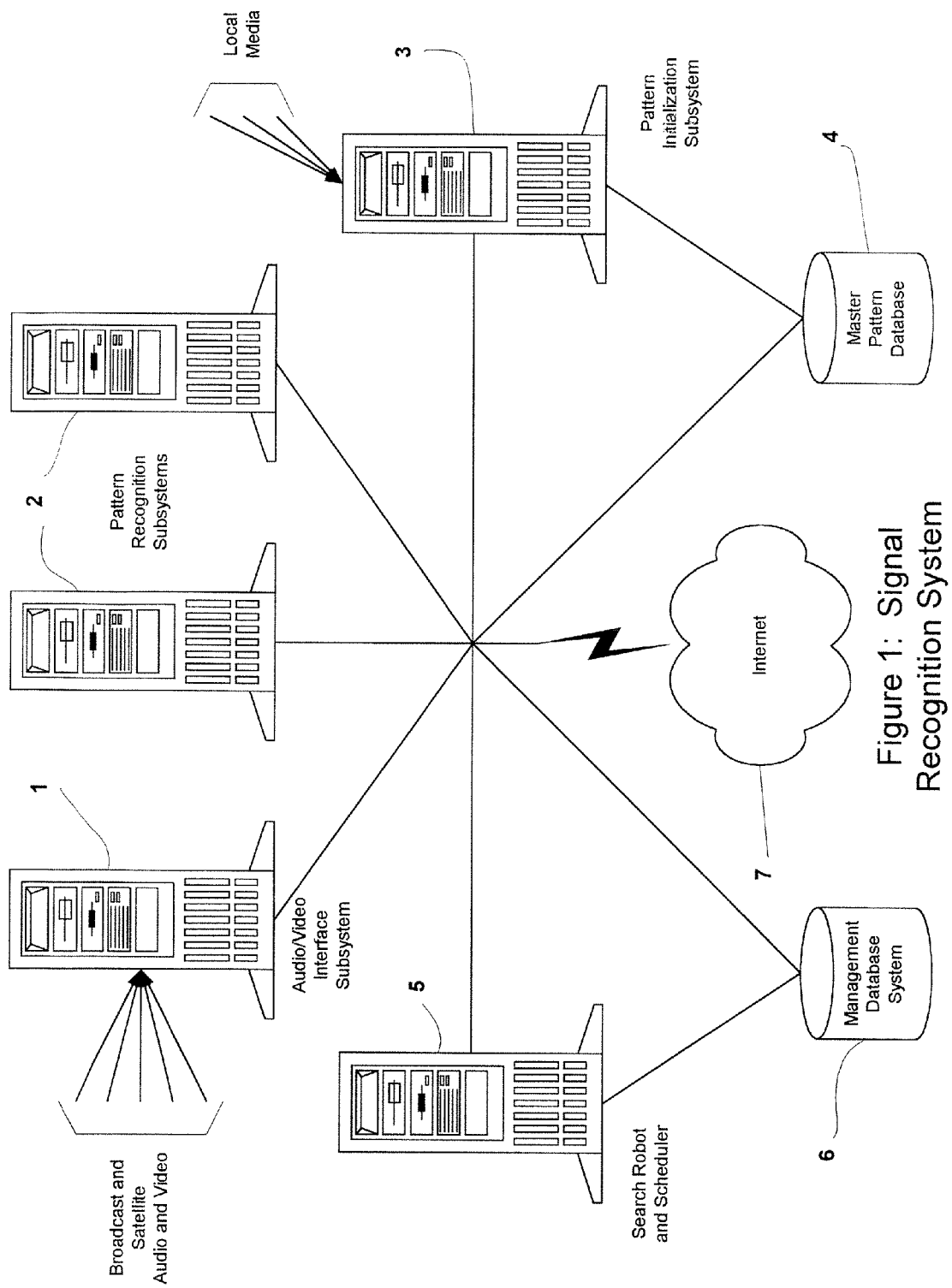

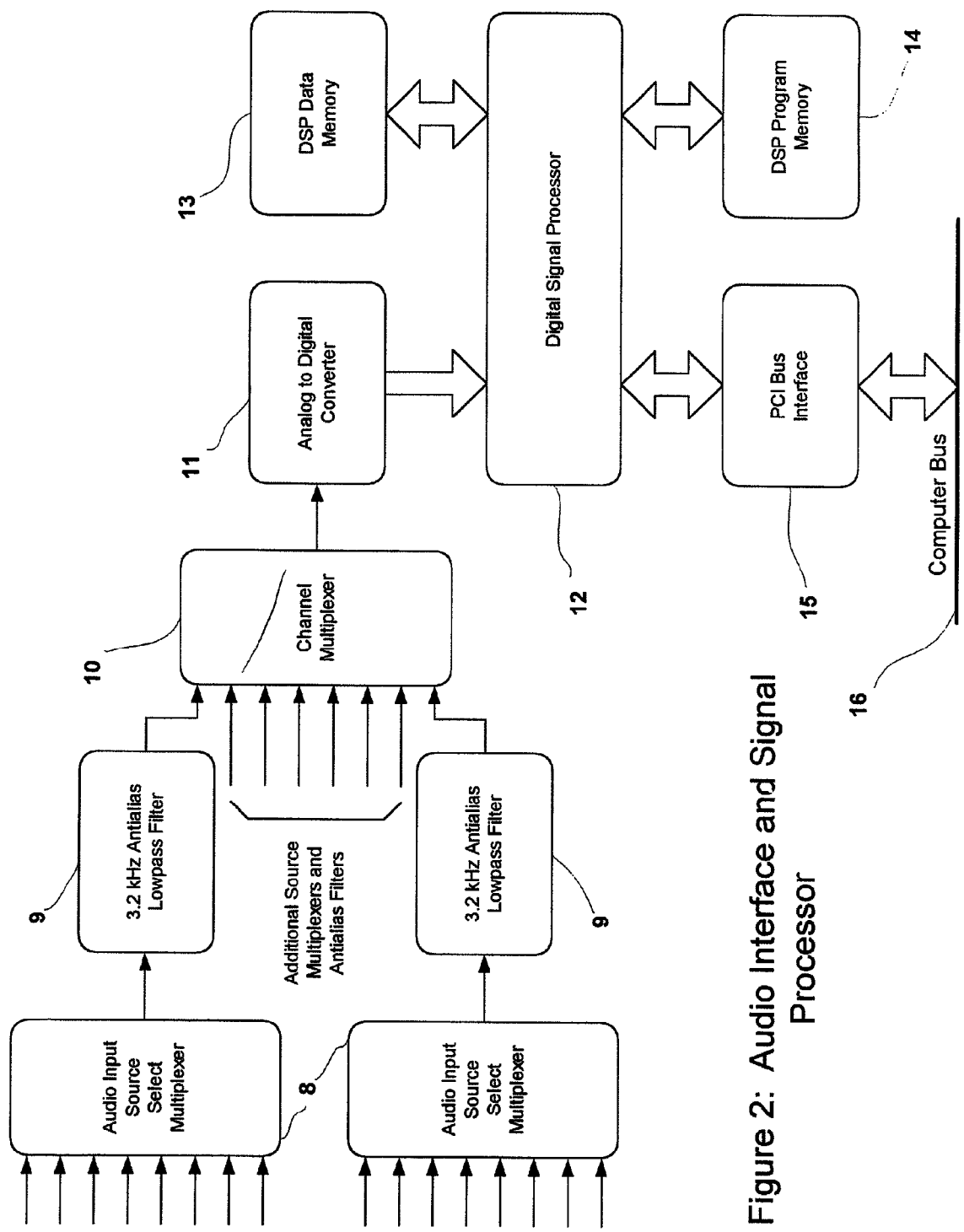
Figure 2: Audio Interface and Signal Processor

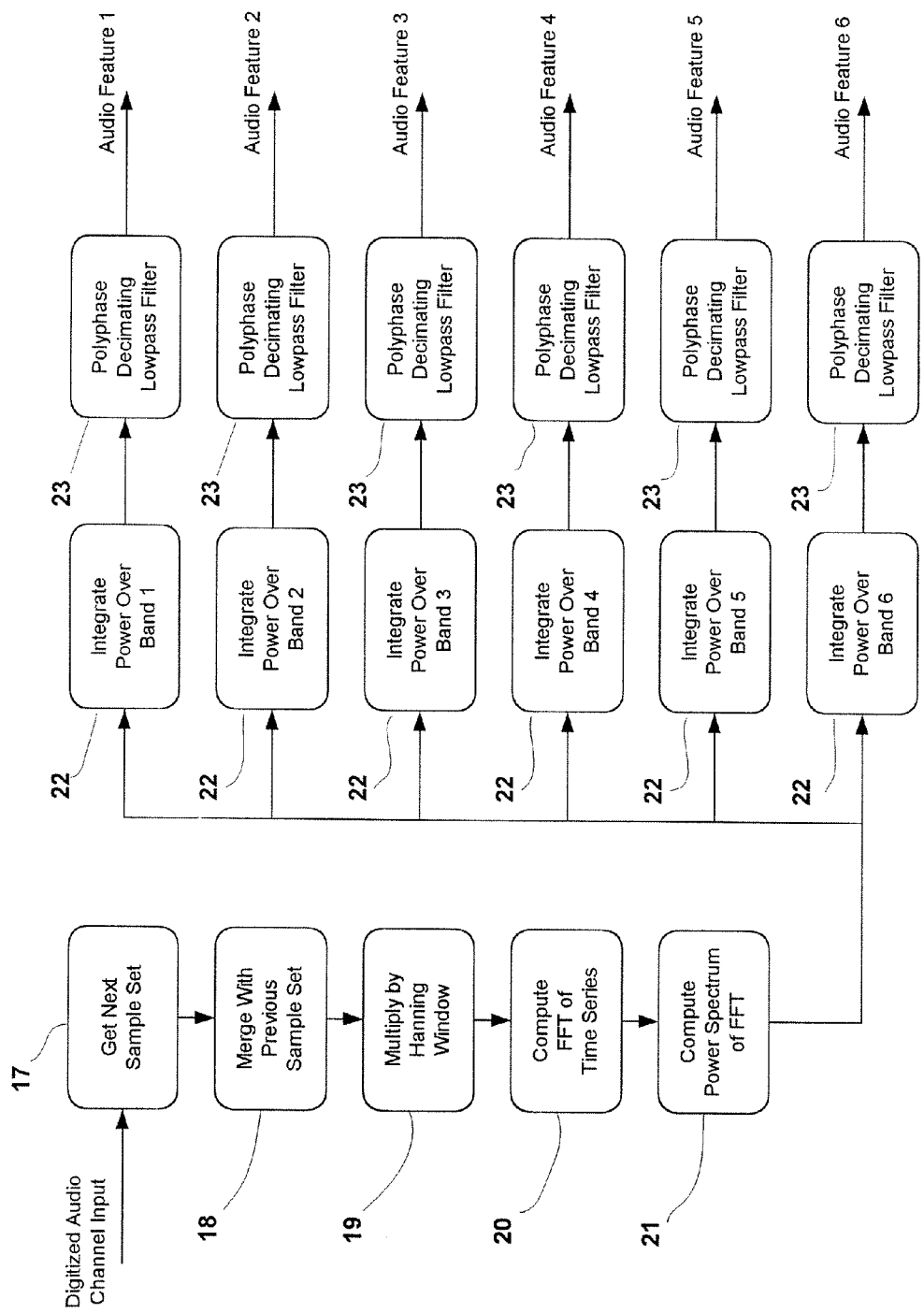
Figure 3: Audio Spectrum Analysis and Feature Extraction

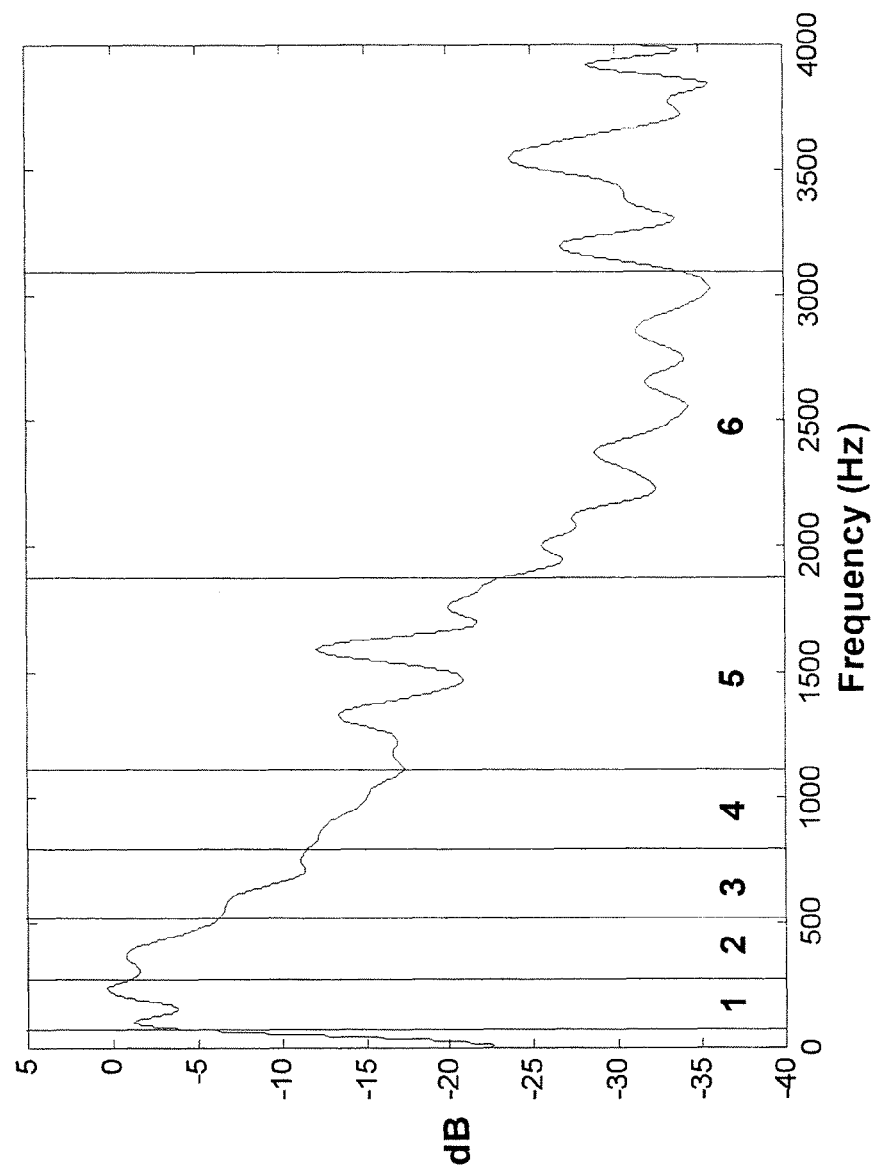
Figure 4: Audio Spectrum Analysis Bands

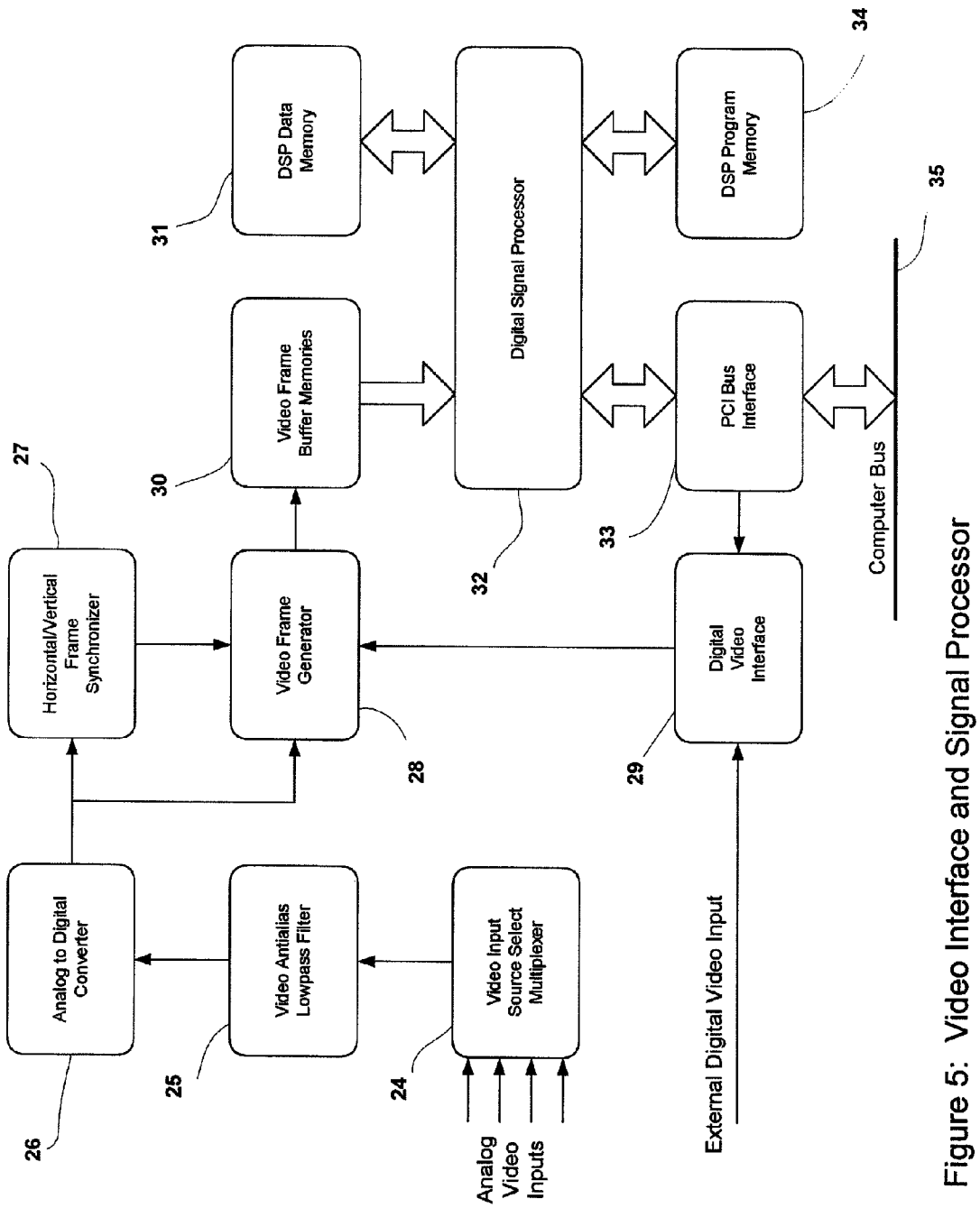
Figure 5: Video Interface and Signal Processor

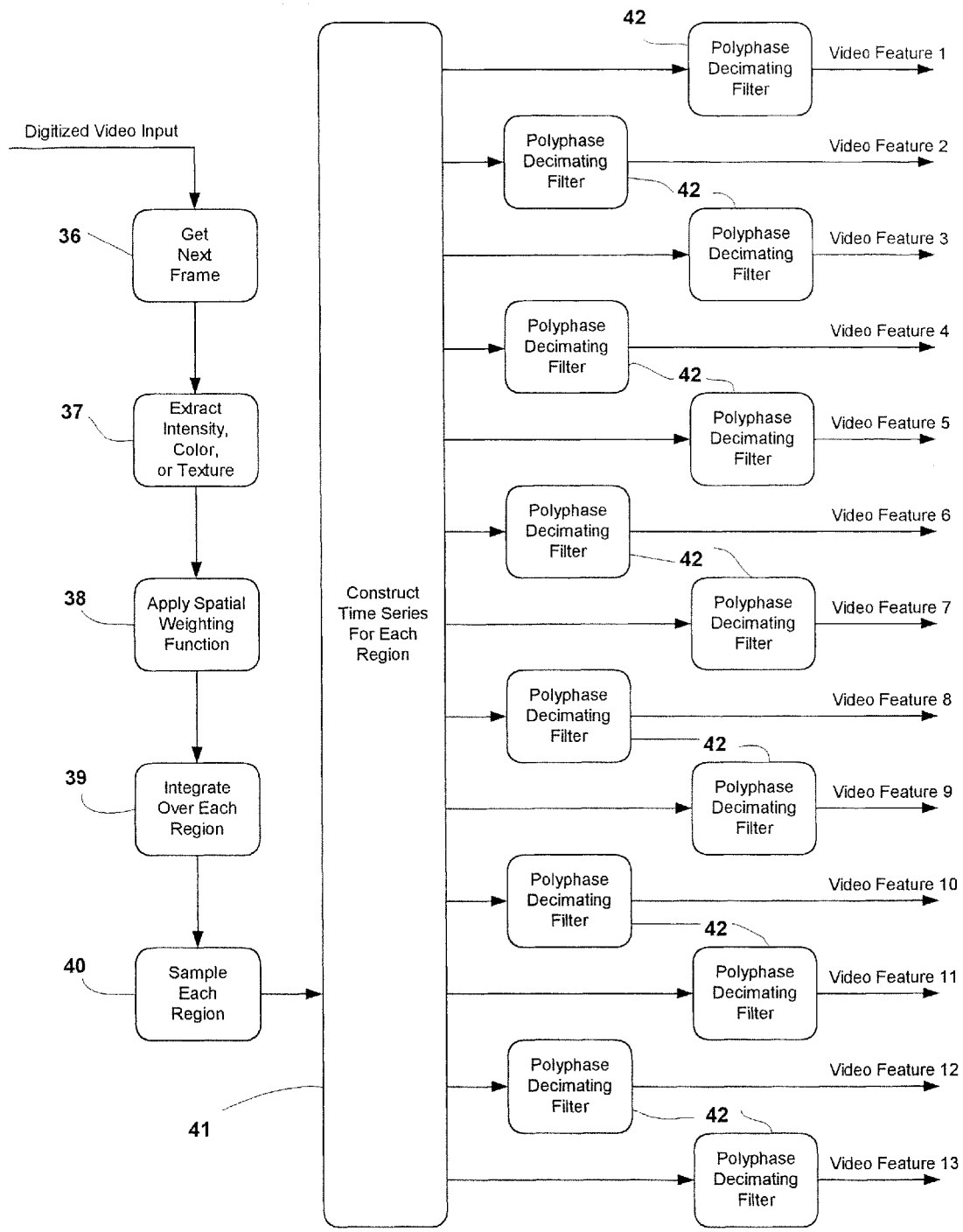
Figure 6: Video Pre-Processing and Feature Extraction

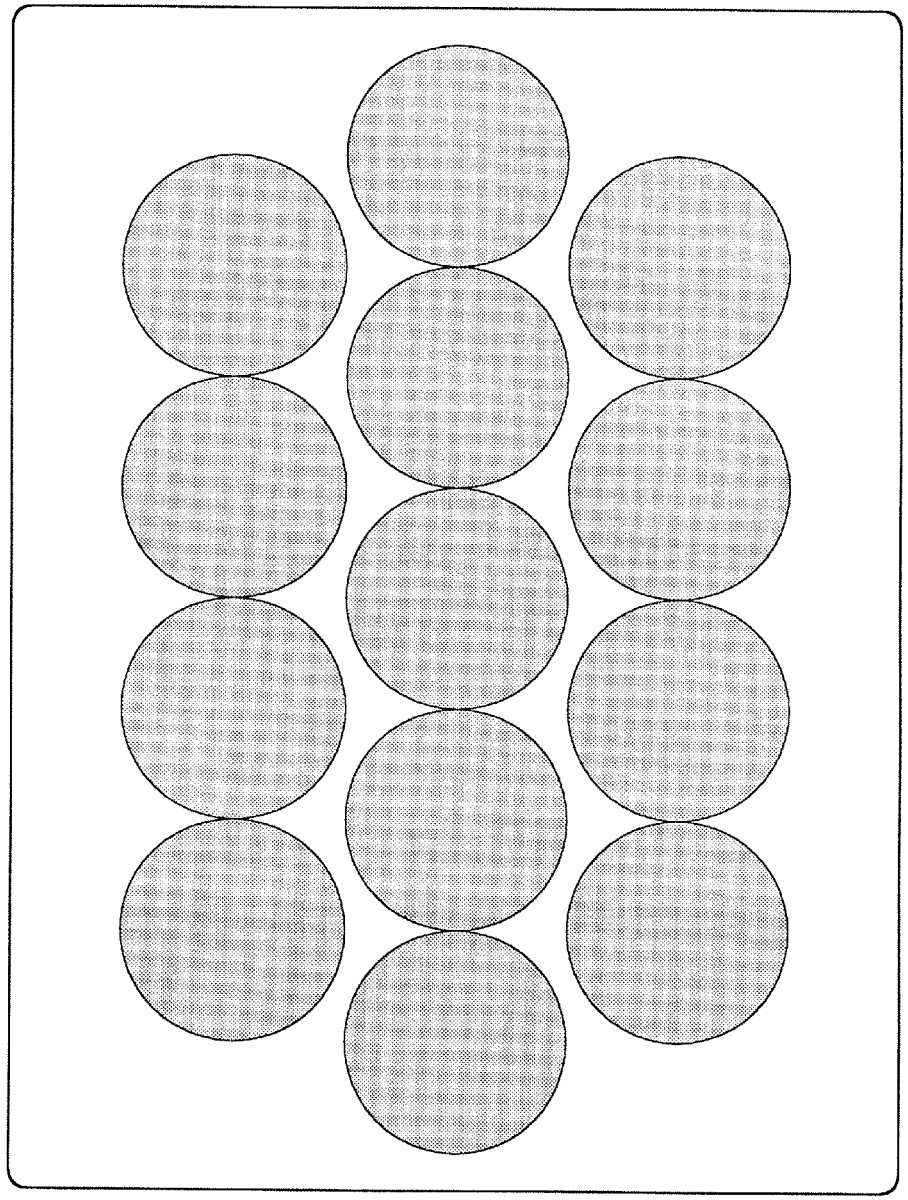
Figure 7: Video Feature Extraction Regions

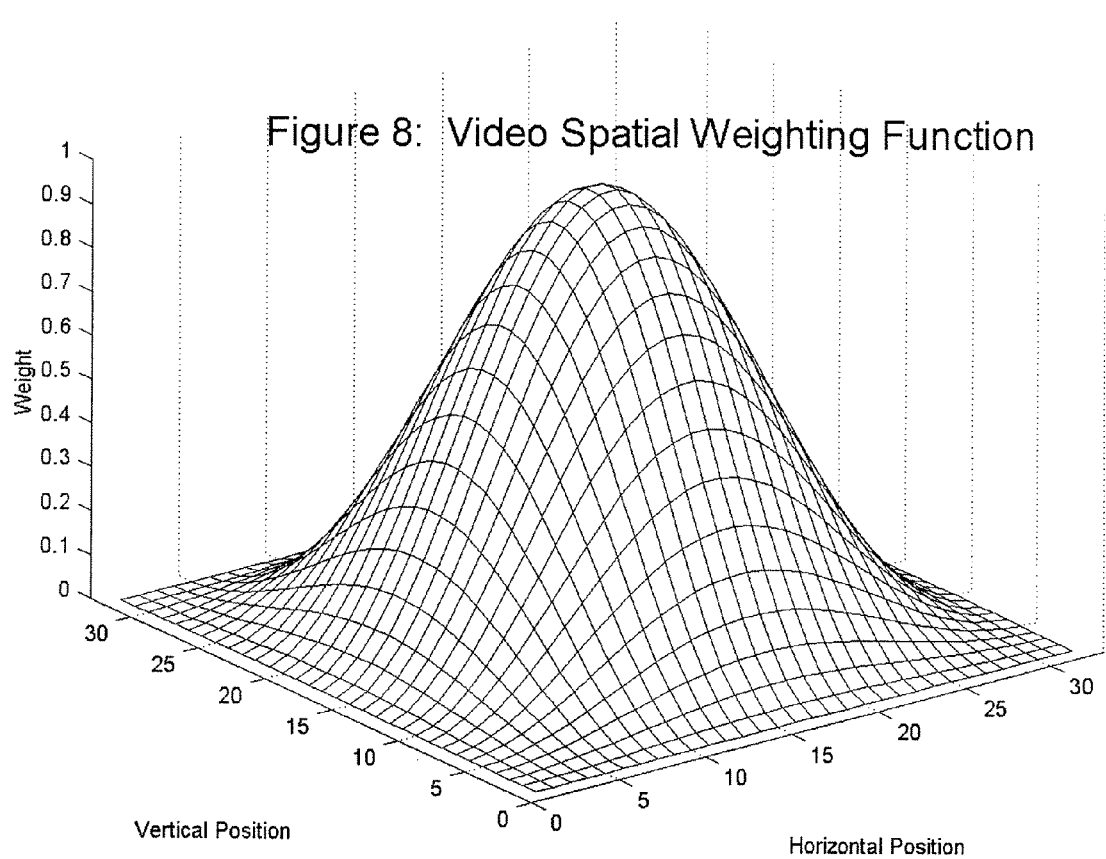
Figure 8: Video Spatial Weighting Function

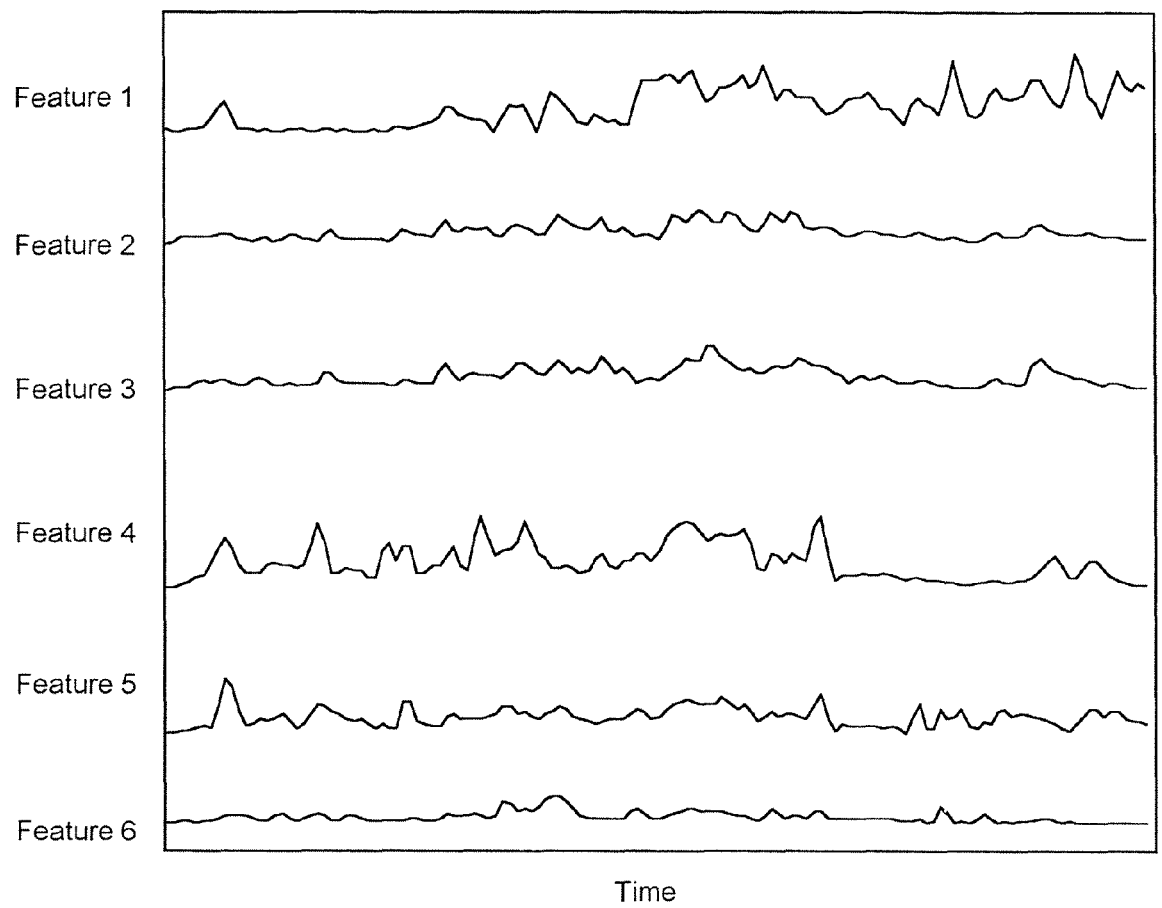
Figure 9: Example Feature Waveforms

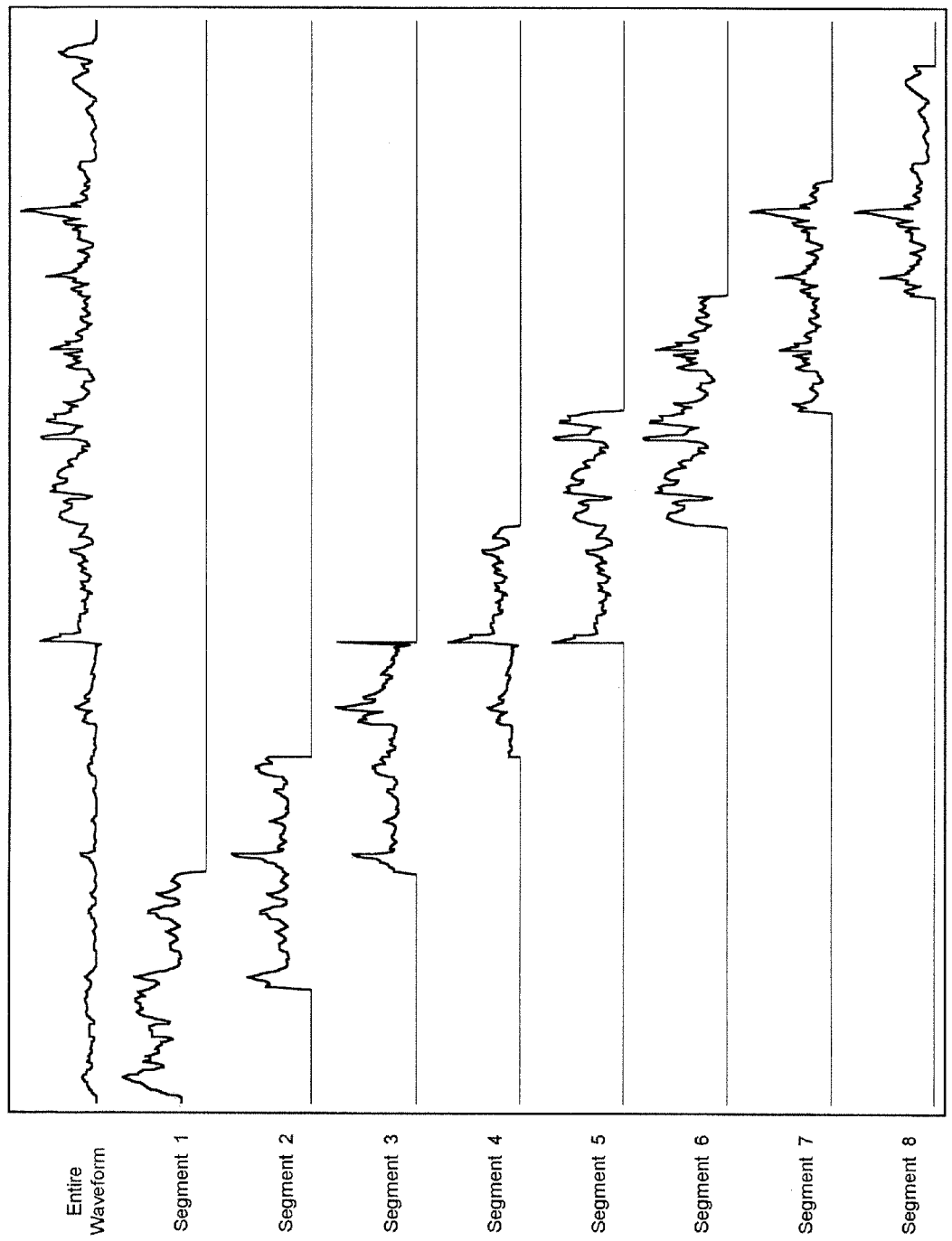
Figure 10: Reference Feature Waveform Segmentation

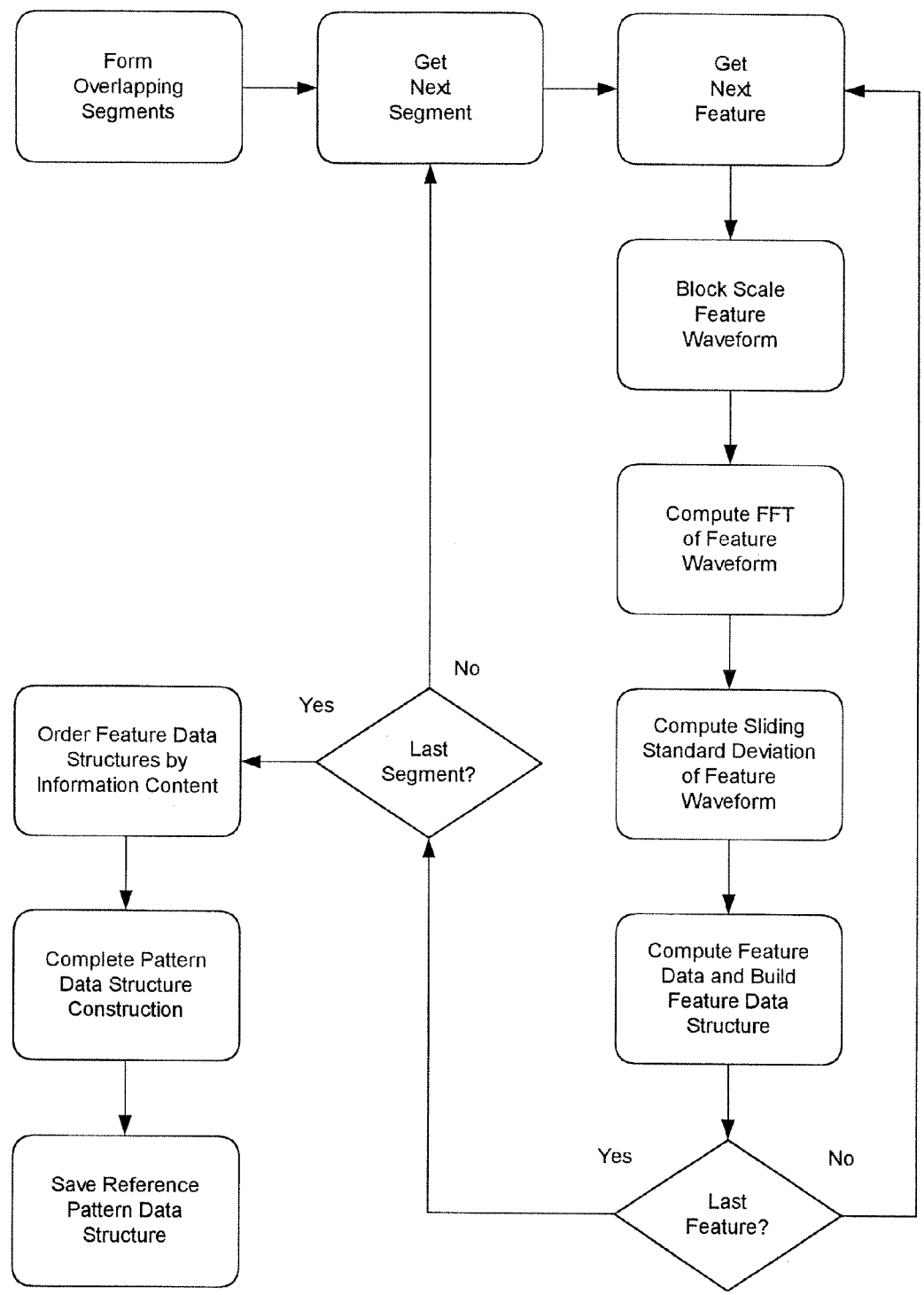
Figure 11: Reference Pattern Initialization

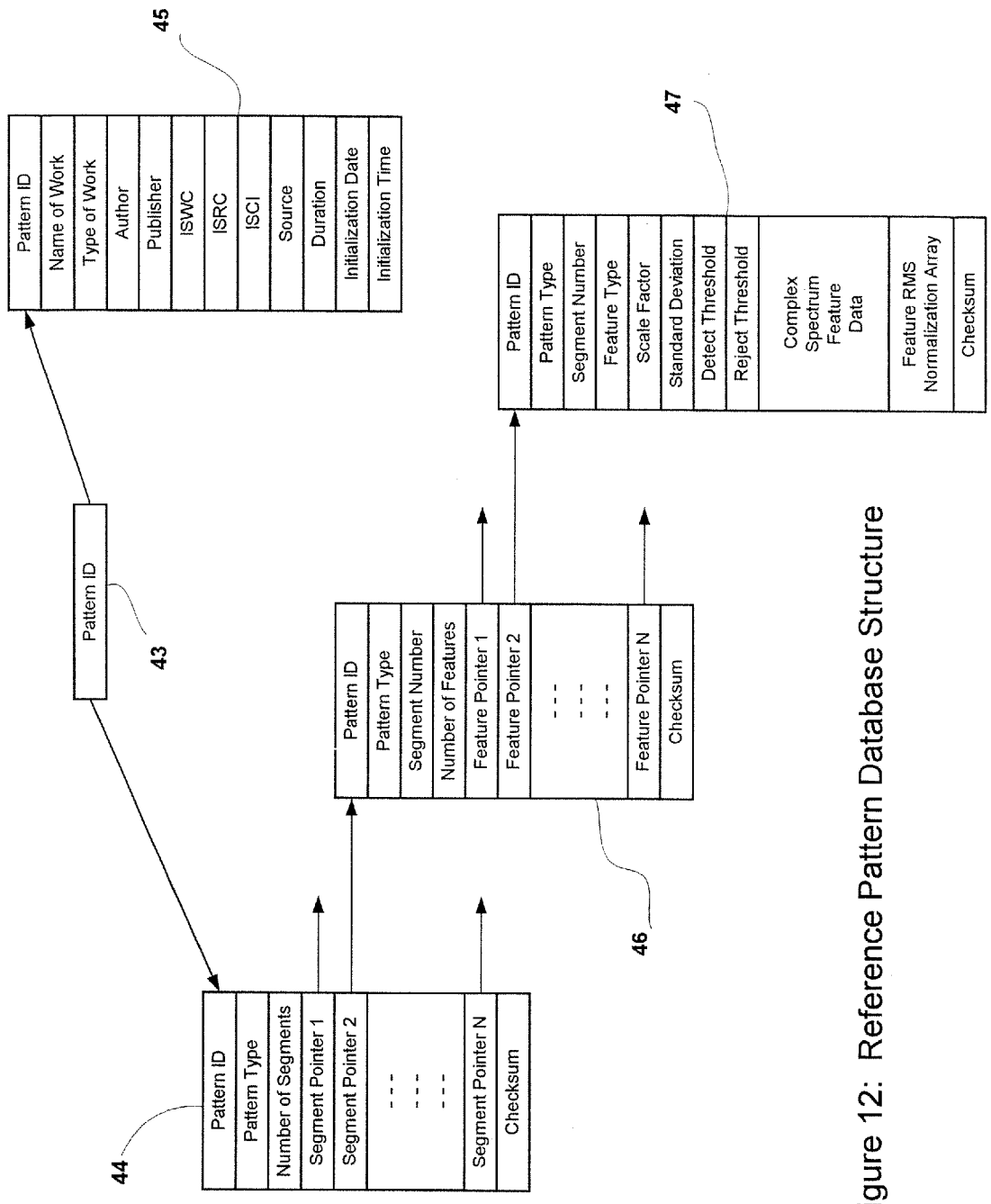
Figure 12: Reference Pattern Database Structure

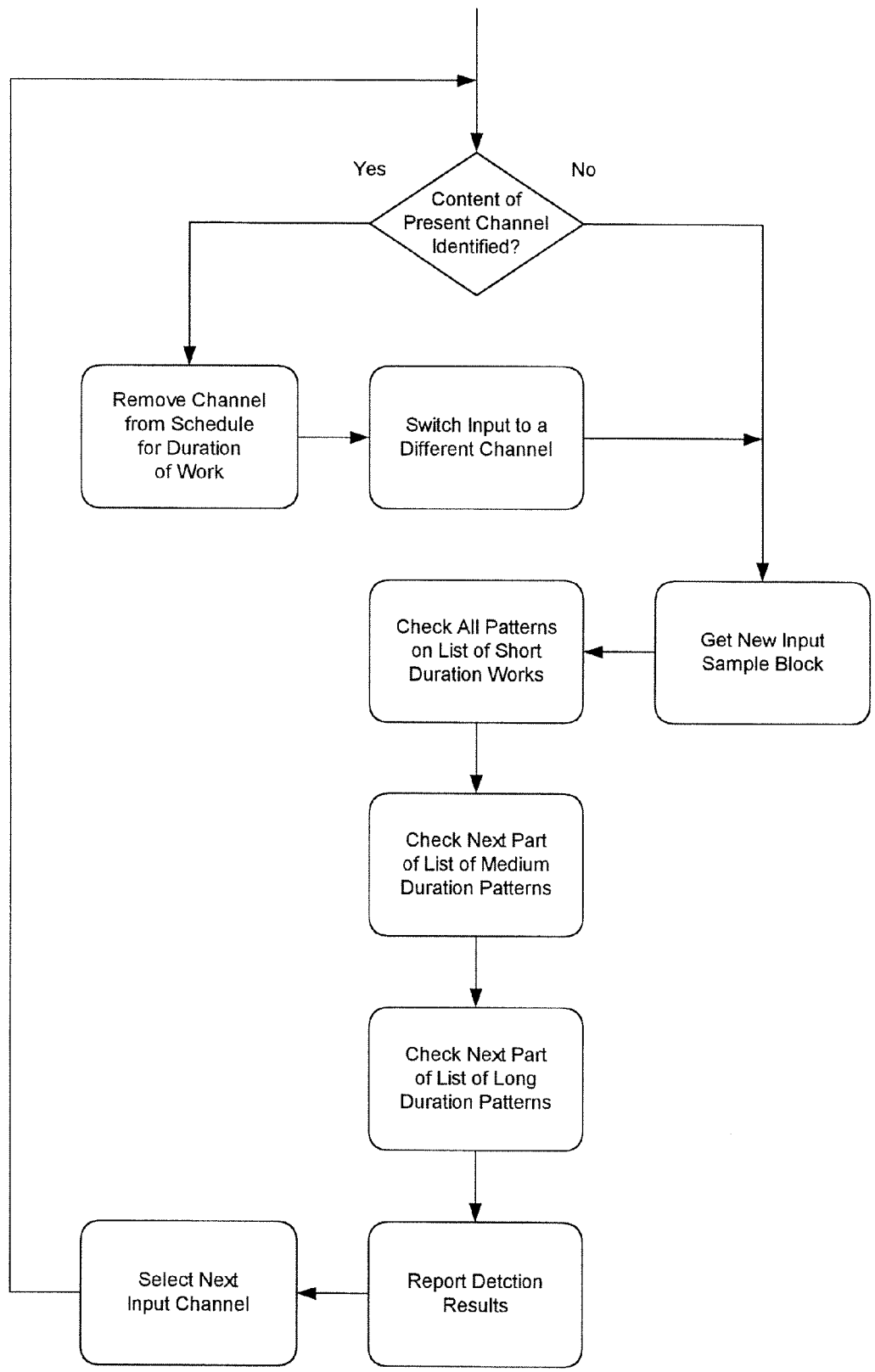
Figure 13: Input Channel and Pattern Scheduler

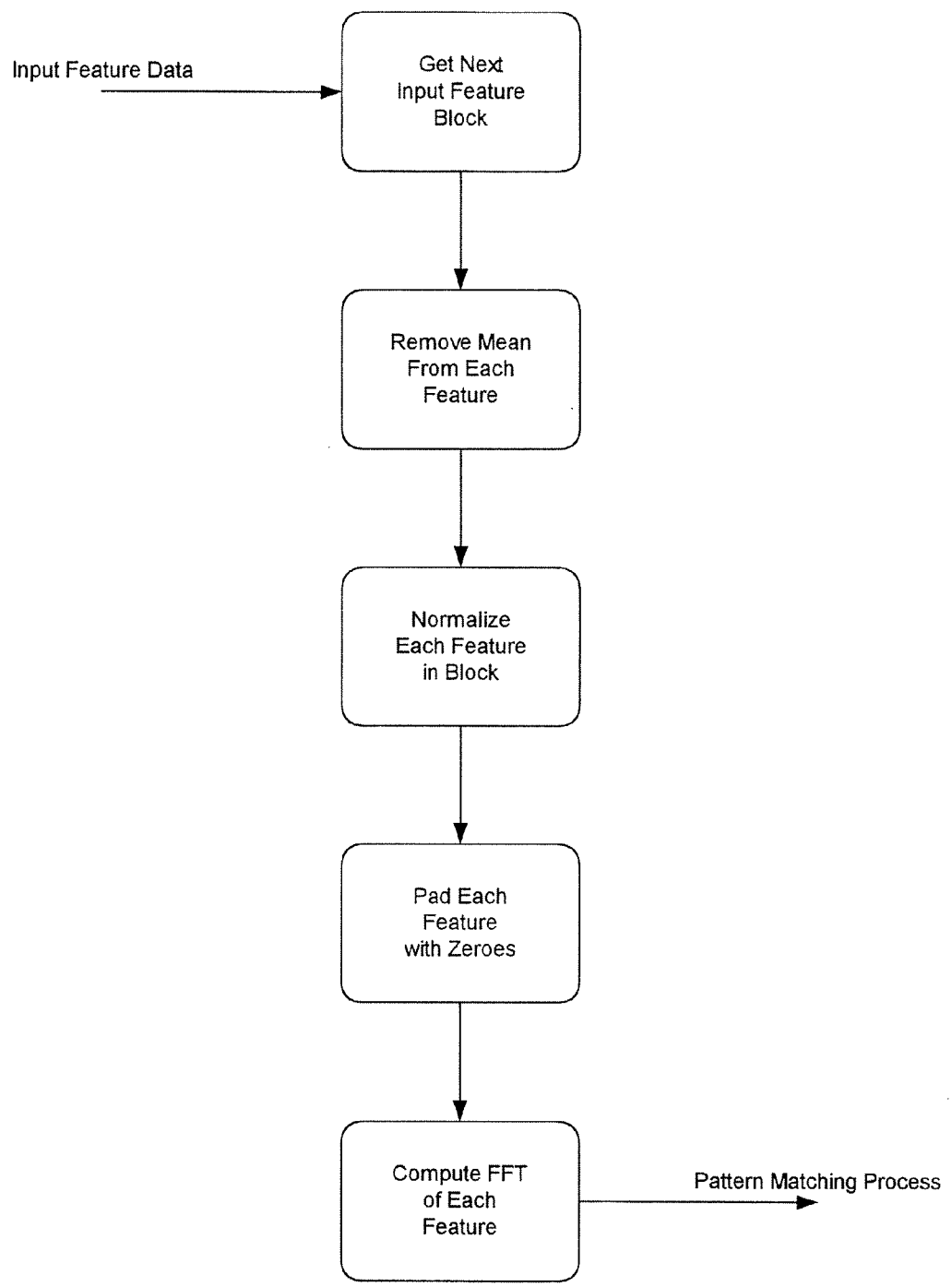
Figure 14: Real-Time Feature Block Pre-Processing

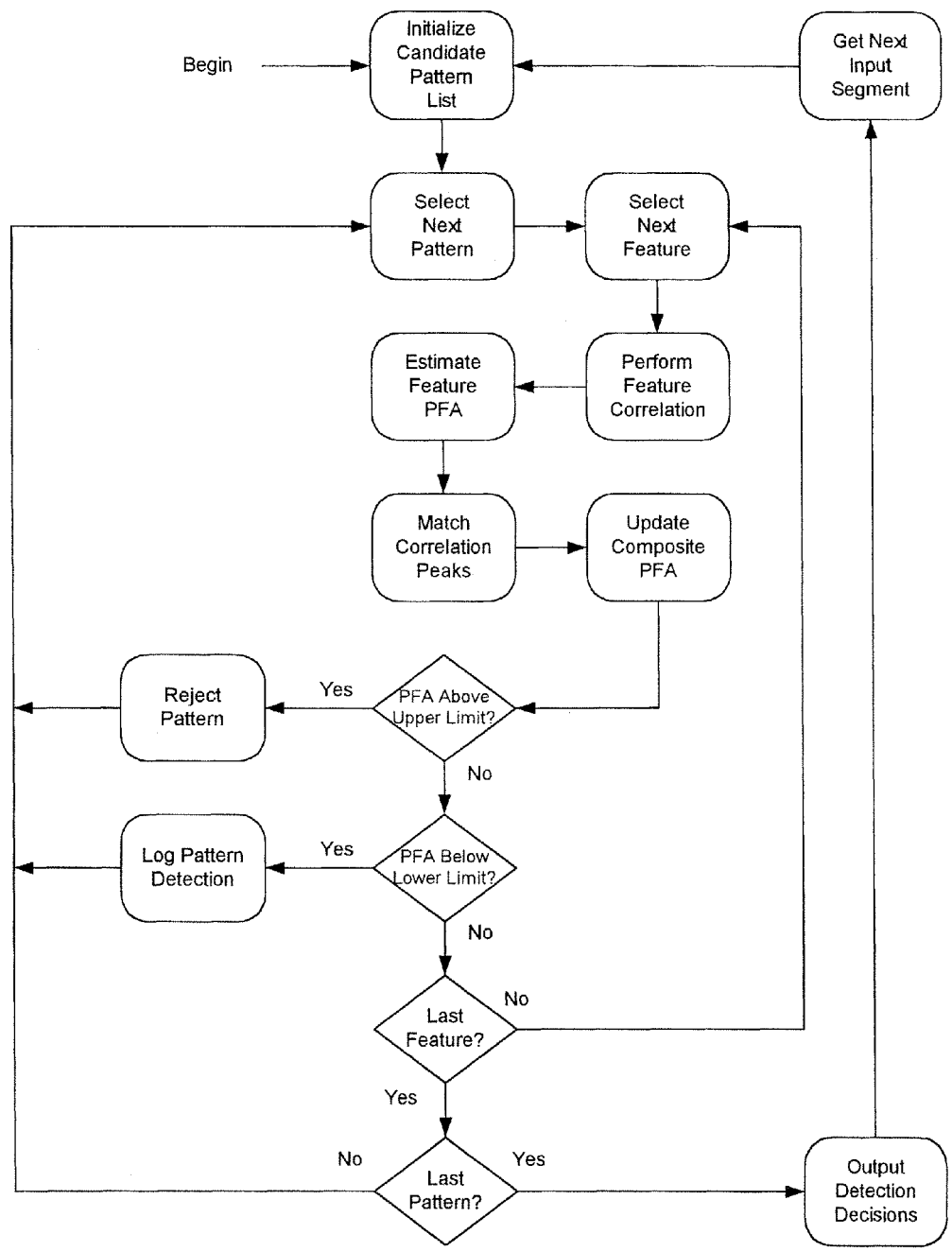
Figure 15: Multiple Feature Correlation Process

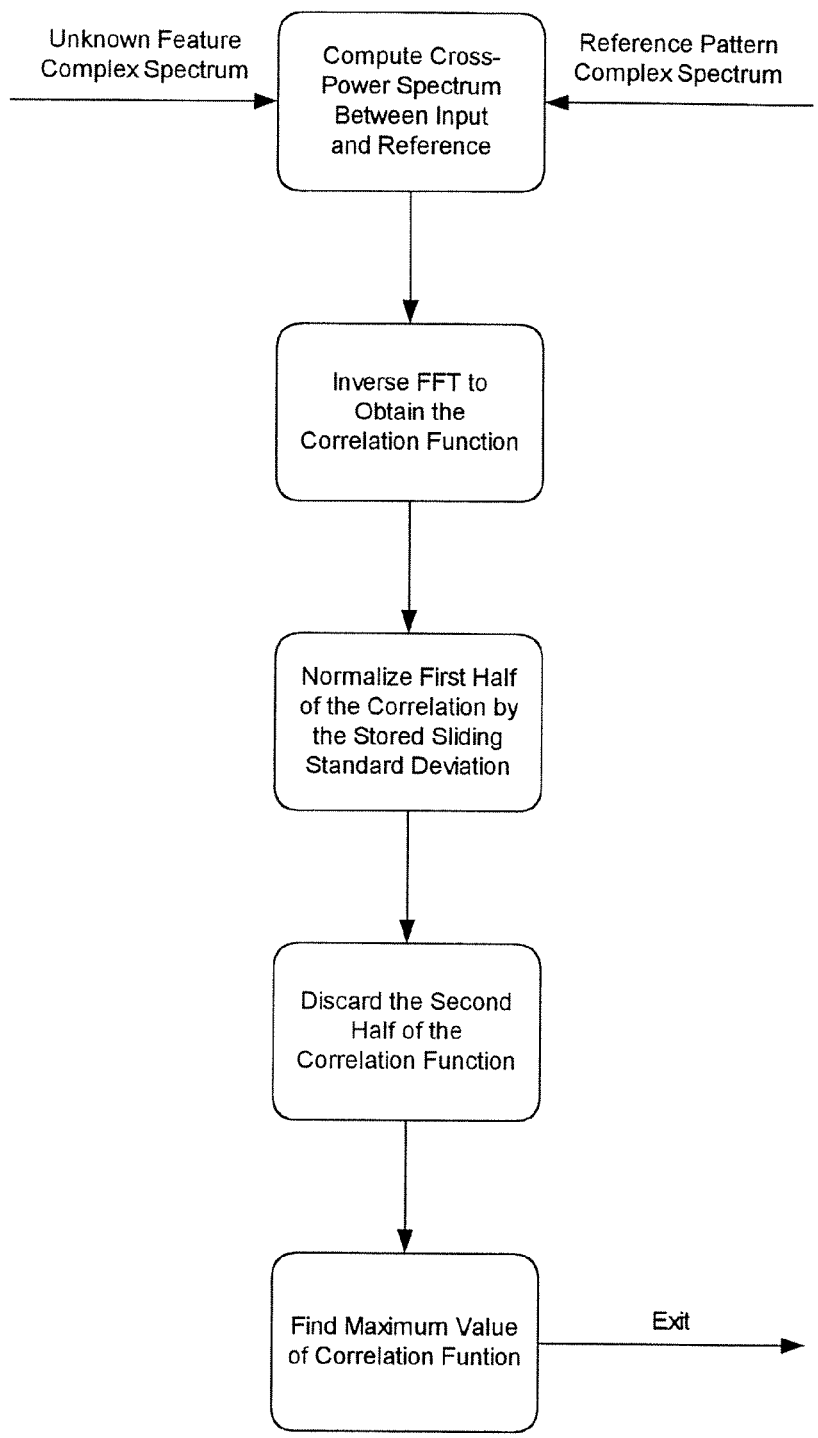
Figure 16: Feature Correlation Process

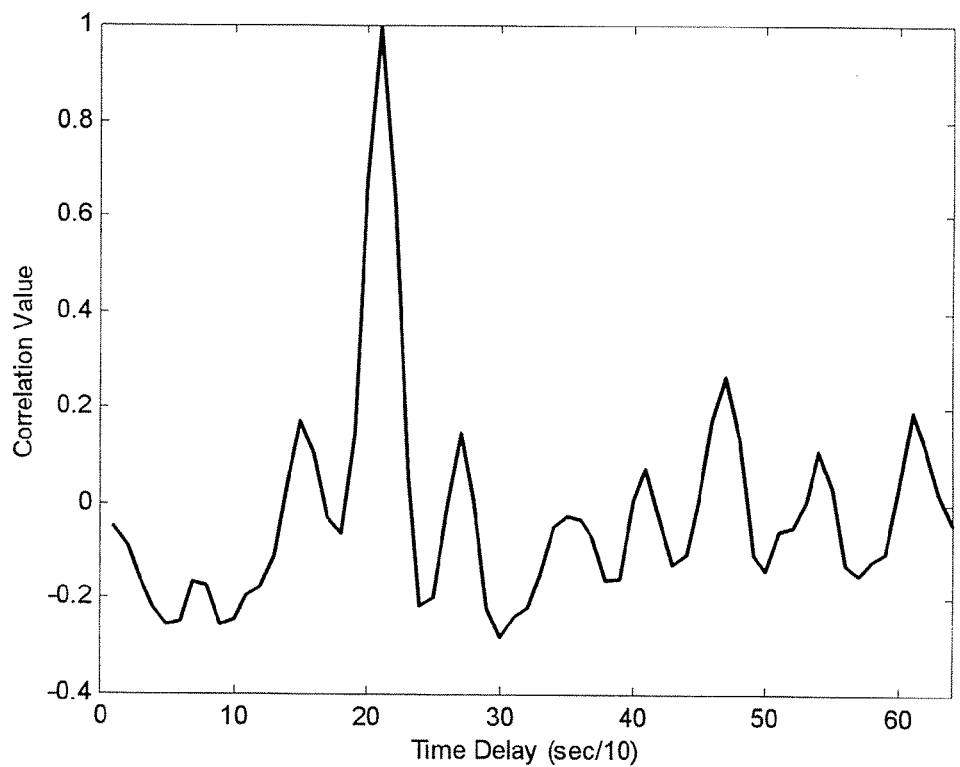
Figure 17: Example Feature Correlation Function

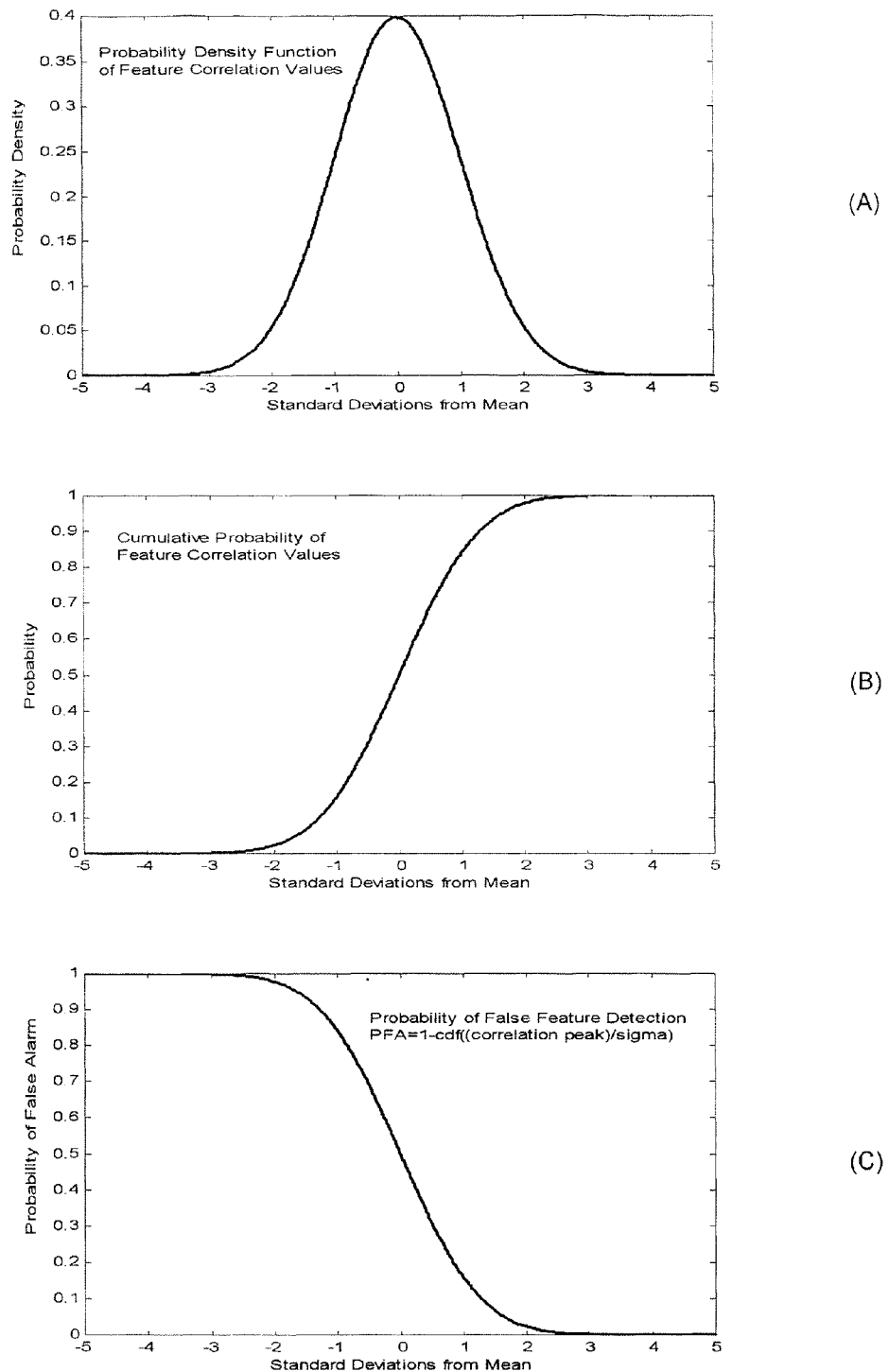
Figure 18: False Detection Estimation from Correlation Values

METHOD AND APPARATUS FOR AUTOMATICALLY RECOGNIZING INPUT AUDIO AND/OR VIDEO STREAMS

This is a continuation of U.S. patent application Ser. No. 09/420,945, filed Oct. 19, 1999 (allowed), which claims priority benefit of U.S. Patent Application No. 60/155,064, filed Sep. 21, 1999, both of which are incorporated herein by reference.

BACKGROUND OF THE INVENTION

1. Technical Field

The present invention relates to apparatus and method for automatically recognizing signals, particularly audio and video signals that may be transmitted via broadcast, computer networks, or satellite transmission. This has particular application in the detection of the transmission of copyright-protected material for royalty payment justification, and in the verification of transmission of scheduled programming and advertising.

2. Related Art

The need for automatic recognition of broadcast material has been established, as evidenced by the development and deployment of a number of automatic recognition systems. The recognized information is useful for a variety of purposes. Musical recordings that are broadcast can be identified to determine their popularity, thus supporting promotional efforts, sales, and distribution of media. The automatic detection of advertising is needed as an audit method to verify that advertisements were, in fact, transmitted at the times and for the duration that the advertiser and broadcaster agreed upon. Identification of copyright-protected works is also needed to assure that proper royalty payments are made. With new distribution methods, such as the Internet and direct satellite transmission, the scope and scale of signal recognition applications has increased.

Automatic program identification techniques fall into the two general categories of active and passive. The active technologies involve the insertion of coded identification signals into the program material or other modification of the audio or video. Active techniques are faced with two difficult problems. The inserted codes must not cause noticeable distortion or be perceivable to listeners and viewers. Simultaneously, the identification codes must be sufficiently robust to survive transmission system signal processing. Active systems that have been developed to date have experienced difficulty in one or both of these areas. An additional problem is that almost all existing program material has not yet been coded. The identification of these works is therefore not possible. For this reason we will dismiss the active technologies as inappropriate for many important applications.

Passive signal recognition systems identify program material by recognizing specific characteristics or features of the signal. Usually, each of the works to be identified is subjected to a registration process where the system "learns" the characteristics of the audio or video signal. The system then uses pattern-matching techniques to detect the occurrence of these features during signal transmission. One of the earliest examples of this approach is presented by Moon et al. in U.S. Pat. No. 3,919,479 (incorporated herein by reference). Moon extracts a time segment from an audio waveform, digitizes it and saves the digitized waveform as a reference pattern for later correlation with an unknown audio signal. Moon also presents a variant of this technique where low bandwidth amplitude envelopes of the audio are used instead of the audio itself. However, both of Moon's approaches suffer from loss of correlation in the presence of speed differences between the reference pattern and the transmitted signal. The speed error issue was addressed by Kenyon et al. in U.S. Pat. No. 4,450,531 (incorporated herein by reference) by using multiple segment correlation functions. In this approach, the individual segments have a relatively low time-bandwidth product and are affected little by speed variations. Pattern discrimination performance is obtained by requiring a plurality of sequential patterns to be detected with approximately the correct time delay. This method is accurate but somewhat limited in capacity due to computational complexity.

A video program identification system is described by Kiewit et al. in U.S. Pat. No. 4,697,209 (incorporated herein by reference). This system detects events such as scene changes to identify program changes. When a change is detected, a signature is extracted from the video signal and stored along with the time of occurrence. A similar process is performed at a central location for each available program source. Periodically the central site interrogates the stored data at the viewer location to obtain the signatures. These are compared to identify the changed program selection. This method has the advantage of only needing to select among a limited set of possibilities, but has the disadvantage that the queuing events that trigger signature extraction are not particularly reliable.

Another video recognition system is described by Thomas et al. in U.S. Pat. No. 4,739,398 (incorporated herein by reference). The method discussed by Thomas identifies video programs by matching video features selected from a number of randomly selected locations in the frame sequence. The intensity, etc. of each location is quantized to one bit of resolution, and these bits are stored in a single word. A sequence of frame signatures is acquired from a program interval with the spacing of frame signatures selected according to a set of rules. Noisy or error prone bits within the signature words are masked. In the preferred embodiment there are eight frame signatures per interval each containing sixteen binary values. A key word is chosen from the frame signature set and is used to stage the pattern recognition process. When the key word is detected by bit comparison, a table of candidate patterns is accessed to locate a subset of patterns to be evaluated. These templates are then compared with the current video signature. Audio recognition is mentioned but no method is presented. Thomas also describes methods for compressing audio and video signals for transmission to a central location for manual identification. Corresponding video signatures are also transmitted. This allows the acquisition of unknown program material so that the new material can be added to a central library for later identification. The unknown signatures transmitted from the remote sites can be identified from templates stored in the central library or by manual viewing and listening to the corresponding compressed video and audio.

An audio signal recognition system is described by Kenyon et. al in U.S. Pat. No. 4,843,562 (incorporated herein by reference) that specifically addresses speed errors in the transmitted signal by re-sampling the input signal to create several time-distorted versions of the signal segments. This allows a high-resolution fast correlation function to be applied to each of the time warped signal segments without degrading the correlation values. A low-resolution spectrogram matching process is also used as a queuing mechanism to select candidate reference patterns for high-resolution pattern recognition. This method achieves high accuracy with a large number of candidate patterns.

In U.S. Pat. No. 5,019,899 Boles et al. (incorporated herein by reference) describe a video signal recognition system that appears to be a refinement of the Thomas patent. However, the method of feature extraction from the video signal is different. After digitizing a frame (or field) of video, the pixels in each of 64 regions is integrated to form super-pixels representing the average of 16×16 pixel arrays. Thirty-two pairs of super-pixels are then differenced according to a predefined pattern, and the results are quantized to one bit of resolution. As in the Thomas patent, a program interval is represented by eight frame signatures that are selected according to a set of rules. The pattern matching procedure involves counting the number of bits that correctly match the input feature values with a particular template. Boles also presents an efficient procedure for comparing the unknown input with many stored templates in real-time. For purposes of this invention, real-time operation requires all patterns to be evaluated in a thirtieth of a second.

Lamb et al. describe an audio signal recognition system in U.S. Pat. No. 5,437,050 (incorporated herein by reference). Audio spectra are computed at a 50 Hz rate and are quantized to one bit of resolution by comparing each frequency to a threshold derived from the corresponding spectrum. Forty-eight spectral components are retained representing semitones of four octaves of the musical scale. The semitones are determined to be active or inactive according to their previous activity status and comparison with two thresholds. The first threshold is used to determine if an inactive semitone should be set to an active state. The second threshold is set to a lower value and is used to select active semitones that should be set to an inactive state. The purpose of this hysteresis is to prevent newly occurring semitones from dominating the power spectrum and forcing other tones to an inactive state. The set of 48 semitone states forms an activity vector for the current sample interval. Sequential vectors are grouped to form an activity matrix that represents the time-frequency structure of the audio. These activity matrices are compared with similarly constructed reference patterns using a procedure that sums bit matches over sub-intervals of the activity matrix. Sub-intervals are evaluated with a several different time alignments to compensate for speed errors that may be introduced by broadcasters. To narrow the search space in comparing the input with many templates, gross features of the input activity matrix are computed. The distances from the macro features of the input and each template are computed to determine a subset of patterns to be further evaluated.

In U.S. Pat. No. 5,436,653 Ellis et al. (incorporated herein by reference) discuss a technique that seems to be a derivative of the Thomas and Boles patents. While the super-pixel geometry is different from the other patents, the, procedures are almost identical. As in the Boles patent, super-pixels (now in the shape of horizontal strips) in different regions of a frame are differenced and then quantized to one bit of resolution. However, sixteen values are packed into a sixteen-bit word as in the Thomas patent, representing a frame signature. Potentially noisy bits in the frame signature may be excluded from the comparison process by use of a mask word. Frames within a program interval are selected according to a set of rules. Eight frame signatures of sixteen bits each are used to represent a program interval. As in the Thomas patent, one of the frame signatures is designated as a "key signature". Key signature matching is used as a queuing mechanism to reduce the number of pattern matching operations that must be performed in the recognition process. Ellis addresses clumping of patterns having the same key signature as well as video jitter that can cause misalignment of superpixels. In addition, Ellis describes a method of using multiple segments or sub-intervals similar to the method described in the Kenyon et al. U.S. Pat. No. 4,450,531. Unlike the Thomas and Boles patents, Ellis offers an audio pattern recognition system based on spectrogram matching. Differential audio spectra are computed and quantized to form sixteen one-bit components. Groups of these spectral signatures are selected from a signal interval. Ellis has updated this method as described in U.S. Pat. No. 5,621,454 (incorporated herein by reference).

Forbes et al. describe in U.S. Pat. No. 5,708,477 (incorporated herein by reference) a system that is used to automatically edit advertisements from a television signal by muting the television audio and pausing any VCR recording in progress. This is done by first detecting changes in the overall brightness of a frame or portion of a frame indicating a scene change. When a scene change is detected, a lowpass filtered version of the frame is compared with a similar set of frames that have been previously designated by the viewer to indicate the presence of an advertisement. When a match is detected, the audio/video is interrupted for an amount of time specified by the viewer when the segment was designated by the viewer as an advertisement. The detection decision is based on a distance metric that is the sum of the absolute values of corresponding input and template region differences. The intensity of various regions appears to be computed by averaging video scan lines. Forbes does not use any audio information or time series properties of the video.

While the inventions cited above in the prior art indicate progress in the technical field of automatic signal identification, there are a number of shortcomings in these technologies. To be accepted in the marketplace a system must have sufficient processing capacity to search simultaneously for a very large number of potential patterns from many different sources. The technologies of the prior art underestimate the magnitude of this capacity requirement. Further, if the capacity of the prior art systems is increased in a linear fashion through the use of faster processors, recognition accuracy problems become evident. These problems are in part due to the underlying statistical properties of the various methods, but are also caused by intolerance of these methods to signal distortion that is typical in the various media distribution and broadcast chains. Most of the cited inventions are designed to handle either audio or video but not both. None of the inventions in the prior art are capable of blending audio and video recognition in a simple uniform manner. While the duration of samples required for recognition varies among the different techniques, none of them is capable of recognizing a short segment from any part of a work and the moving to a different channel.

Thus, what is needed is a signal recognition system that can passively recognize audio and/or video data streams in as little as six seconds with great accuracy. Preferably, the system can recognize any portion of the input data stream, thus allowing channel-hopping as the system quickly recognizes one broadcast work and moves on to another.

SUMMARY OF THE INVENTION

It is an object of the present invention to overcome the problems and limitations described above and to provide a system for recognizing audio, video, mixed, and/or data streams with great accuracy, minimal time, and with fewer processors.

In one aspect of the present invention, an apparatus for recognizing an input data stream comprises a receiver for receiving the input data stream, and an interface for (i) randomly selecting any one portion of the received data stream and (ii) forming a first plurality of feature time series waveforms corresponding to spectrally distinct portions of the received data stream. A memory is provided for storing a second plurality of feature time series waveforms. One or more processors are provided for correlating the first plurality of feature time series waveforms with the second plurality of feature time series waveforms, and for designating a recognition when a statistic of correlation values between the first plurality of feature time series waveforms and one of the second plurality of feature time series waveforms reaches a predetermined value.

According to another aspect of the present invention, an apparatus for forming video features from an input stream includes a receiver for receiving an input video stream which corresponds to a video screen having a plurality of regions, the video screen comprising a plurality of pixels having intensity and color. One or more processors are provided for (i) receiving the video stream from the receiver, (ii) integrating at least one of the intensity and the color of video signals corresponding to each of the plural areas of the video screen, (iii) forming a set of low rate time series data streams from the integrated video signals, (iv) forming overlapping time intervals of the multiple feature streams such that the overlapping time intervals encompass the entire received video frame sequence, (v) determining the most distinctive information from each time interval, (vi) rank-ordering the time interval segments according to their distinctness, (vii) transforming the rank-ordered time interval segments to produce complex spectra, and (viii) storing the formed data as video features.

According to yet another aspect of the present invention, apparatus for forming audio features from an input audio stream has a receiver for receiving the input audio stream and separating the received audio stream into a plurality of different frequency bands. Processor structure is included for (i) extracting energy from each of the plurality of frequency bands, (ii) integrating the energy extracted from each of the plurality of frequency bands, (iii) forming multiple feature streams from the integrated energy, (iv) forming overlapping time intervals of the multiple feature streams such that the overlapping time intervals encompass the entire received audio stream, (v) determining the most distinctive information from each time interval, (vi) rank-ordering the time interval segments according to their distinctness, and (vii) transforming the rank-ordered time interval segments to produce complex spectra. A memory is also provided for storing the transformed complex spectra.

In another aspect of the present invention, a method for recognizing an input data stream, comprises the steps of: (i) receiving the input data stream; (ii) randomly selecting any one portion of the received data stream; (iii) forming a first plurality of feature time series waveforms corresponding to spectrally distinct portions of the received data stream; (iv) storing a second plurality of feature time series waveforms; (v) correlating the first plurality of feature time series waveforms with the second plurality of feature time series waveforms; and (vi) designating a recognition when a correlation probability value between the first plurality of feature time series waveforms and one of the second plurality of feature time series waveforms reaches a predetermined value.

In still another aspect of the present invention, a method for forming video features from an input video stream, comprises the steps of: (i) receiving an input video stream which corresponds to a video screen having a plurality of regions, the video screen comprising a plurality of pixels having intensity and color; (ii) integrating at least one of the intensity and the color of video signals corresponding to each of the plural areas of the video screen; (iii) forming a set of low rate time series data streams from the integrated video signal; (iv) forming overlapping time intervals of the multiple feature streams such that the overlapping time intervals encompass the entire received audio stream; (v) determining the most distinctive information from each time interval; (vi) rank-ordering the time interval segments according to their distinctness; (vii) transforming the rank-ordered time interval segments to produce complex spectra; and (viii) storing the transformed complex spectra as video features.

According to a further aspect of the present invention, a method for forming audio features from an audio stream, comprises the steps of: (i) receiving the input audio stream and separating the received audio stream into a plurality of different frequency bands; (ii) extracting energy from the plurality of frequency bands; (iii) integrating the energy extracted from each of the plurality of frequency bands; (iv) forming multiple feature streams from the integrated energy; (v) forming overlapping time intervals of the multiple feature streams such that the overlapping time intervals encompass the entire received audio stream; (vi) determining the most distinctive information from each time interval; (vii) rank-ordering the time interval segments according to their distinctness; (viii) transforming the rank-ordered time interval segments to produce complex spectra; and (ix) storing the transformed complex spectra as audio features.

In a further aspect of the present invention, a computer readable storage medium stores a program which causes one or more computers to recognize an input data stream, the stored program causing the one or more computers to: (i) receive the input data stream; (ii) randomly select any one portion of the received data stream; (iii) form a first plurality of feature time series waveforms which corresponds to spectrally distinct portions of the received data stream; (iv) store a second plurality of feature time series waveforms; (v) correlate the first plurality of feature time series waveforms with the second plurality of feature time series waveforms; and (vi) designate a recognition when a correlation probability value between the first plurality of feature time series waveforms and one of the second plurality of feature time series waveforms reaches predetermined value.

According to yet another aspect of the present invention, a method for forming recognition features from an input data stream, comprises the steps of: (i) receiving the input data stream; (ii) forming a plurality of feature time series waveforms which correspond to spectrally distinct portions of the received input data stream; (iii) forming multiple feature streams from the plurality of feature time series waveforms; (iv) forming overlapping time intervals of the multiple feature streams; (v) estimating the distinctiveness of each feature in each time interval; (vi) rank-ordering the features according to their distinctiveness; (vii) transforming the feature time series to obtain complex spectra; and (viii) storing the feature complex spectra as the recognition features.

BRIEF DESCRIPTION OF THE DRAWINGS

The above objects and other advantageous features of the present invention will be more readily understood from the following detailed description of the preferred embodiment when taken in conjunction with the drawings which are described below.

FIG. 1 illustrates a system level diagram of the signal recognition system. The system includes one or more Audio/Video Interface Subsystems that collect signals and extract feature packets to be identified. Also included are one or more Pattern Recognition Subsystems that perform the actual signal identifications. One or more Pattern Initialization Subsystems are included that generate the reference patterns from recorded media. These patterns are stored in a Master Pattern Database as well as being distributed to the Pattern Recognition Subsystems. A Search Robot and Scheduler locates signals of interest and controls acquisition of feature packets and distribution of these packets among Pattern Recognition Subsystems. Detections and their time of occurrence are stored in a Management Database System for the production of reports. The system is organized as a network and is also connected to the Internet to allow access to online distribution sites.

FIG. 2 is a block diagram of the Audio Interface and Signal Processor. This is a component of the Audio/Video Interface Subsystem. There are typically several of these boards in each Interface Subsystem. Each board connects to many audio sources and produces feature packets to be identified.

FIG. 3 shows the signal processing functions that are performed to extract multiple low-bandwidth feature streams from each of several audio streams. These processes include repetitive spectral analyses and the estimation of energy in each of several frequency bands. Sequences of these energy estimates are then lowpass filtered and decimated to produce low speed feature time series.

FIG. 4 illustrates a typical audio power spectrum and the partitioning of this spectrum into several frequency bands. Lower frequency bands are narrower than the higher frequency bands to balance the total power in each band and to match the human auditory characteristics.

FIG. 5 is a block diagram of the Video Interface and Signal Processor. This is also a component of the Audio/Video Interface Subsystem and produces low bandwidth feature packets from video data. There are typically several of these boards in each Interface Subsystem. Each board connects to several video sources and processes multiple video streams in real-time.

FIG. 6 is a description of the signal processing functions used to produce video feature time series data. For each video frame we extract a measurement frame that may consist of spatial characteristics such as intensity, color, or texture. A spatial weighting function is then applied to multiple regions of the frame and the energy in each region is integrated. The integrated energy in each region is then sampled to form multiple feature time series streams. Each stream is then lowpass filtered and decimated to produce low sample rate video features.

FIG. 7 is an example of the regions from which the video features are extracted. These regions have been selected so that reliable features can be extracted from video frames with very coarse spatial resolution and any of a number of aspect ratios.

FIG. 8 is an example of the video spatial weighting function that is applied to each region. The effect of this window is to weight pixels near the center of the region more heavily than those near the edges. This reduces the sensitivity of the features to spatial translation and scaling errors.

FIG. 9 illustrates several feature time series waveforms.

FIG. 10 illustrates the partitioning of a single feature waveform into overlapped segments. These segments are then normalized, processed, and stored in the pattern database for later recognition.

FIG. 11 shows the signal processing steps that are used to generate a reference pattern data structure from the feature time series waveforms. First the features from the entire work are grouped into a sequence of overlapping time segments. Each feature from each segment is then block scaled to a fixed total power. The scaled feature is then processed by a fast Fourier transform to produce the complex spectrum. The sliding standard deviation of the scaled feature is also computed over an interval equal to half of the segment length. The individual data structures representing each feature of each segment are then constructed. When all features of all segments have been processed, the features within each segment are rank ordered according to their information content. The top level of the pattern data structure is then constructed.

FIG. 12 illustrates the structure of a database reference pattern entry. A reference pattern identification code is used to both the reference pattern data structures and a data structure that describes the work. The reference pattern data structure identifies whether the work is audio or video or both. It then includes a list of pointers to segment descriptors. Each segment descriptor contains pattern and segment identification codes and a list of pointers to feature structures. Each feature structure contains pattern, segment, and feature identification codes and the pattern data itself.

Included in the pattern data are the scale factor used to normalize the data, the standard deviation of random correlations, a detection probability threshold, and a rejection probability threshold. After these parameters are the complex spectrum of feature waveform and the sliding standard deviation (RMS) of the feature waveform. Each component of the overall data structure may also contain a checksum to validate data integrity.

FIG. 13 is an example of the channel and pattern scheduler. If the audio and/or video on the current channel is known from a previous recognition cycle, the channel can be removed from the schedule for the amount of time remaining in a particular work. This is determined from the segment number identified and the total number of segments in the work. The signal input can then be switched to a different source to sample and identify its content. Depending on the duration of a particular work the system must search for it at different intervals. For example, brief advertisements must be checked on each update cycle while the system could check for feature length movies at intervals of several minutes. This is accomplished by grouping patterns into several lists according to their duration. In the figure three lists are shown. The system processes only a part of the longer lists during each update cycle to conserve computational resources. Once detection results have been reported another input channel is selected and the process is repeated. Note that all of these processes will normally be occurring in parallel on several different processors for many channels and many patterns.

FIG. 14 is the preprocessing of features that occurs during real-time pattern recognition. A new block of feature data is acquired and the mean is removed from each feature. Each feature is then normalized to fixed total power. The normalized feature blocks are then padded to double their length by appending zeros. The fast Fourier transform of each feature block is then computed to produce the complex spectrum.

FIG. 15 shows the strategy and procedure used to identify a work using a subset of available features. The unknown input feature block is compared with each segment of each work. For each segment of a work features are evaluated sequentially according to their information content. The probability of false alarm is estimated each time new information is added. Detection/rejection decisions are made on the basis of two sets of probability thresholds.

FIG. 16 illustrates the feature correlation process between an unknown feature complex spectrum and a candidate reference pattern complex spectrum. The cross-power spectrum is first computed prior to computing the inverse FFT, yielding a cross-correlation function. The first half of this is normalized by the sliding standard deviation. The second half of the correlation functions contains circularly wrapped values and is discarded.

FIG. 17 is an example of a feature correlation function containing a detection event.

FIG. 18 illustrates how false detection probabilities are derived from a distribution of random correlation values. As shown in (A), the probability density function of mismatched correlation values is estimated for a large group of background patterns during initialization. The cumulative distribution function (B) is then estimated by integrating (A). Finally, the probability of false alarm is estimated by subtracting the CDF from one as shown in (C).

DETAILED DESCRIPTION OF THE PRESENTLY PREFERRED EXEMPLARY EMBODIMENT

1. Introduction

The preferred embodiment of the present invention is a highly flexible signal collection and identification system that is capable of processing audio, video, multimedia signals, data signals, etc. from diverse sources. These sources include conventional broadcast, satellite distribution feeds, Internet, data distribution networks, and various subscription services. To accomplish these objectives, the preferred exemplary embodiment is configured as a distributed network of computer subsystems where each subsystem has specific functions. These subsystems can be replicated as necessary to provide the needed number of inputs and support the recognition of as many different works as desired. For example, one broadcast audio and video signal recognition station in one city may comprise one multi-channel video receiver, one multi-channel audio receiver, six audio interface computers, six video interface computers, one scheduler computer, and a mass data storage device. Each of the computers may comprise a Pentium CPU with appropriate RAM and disk storage, digital signal processors, and standard LAN and Internet connections. Of course, each recognition station may be configured with the appropriate hardware and software to detect those signals, which are of interest at that station.

2. System Overview

The present invention discloses a technology and system for the automatic identification of signals using a method known as passive pattern recognition. The method described is capable of identification of program material based on audio content, video image sequences, or a combination of both. As contrasted with active signal recognition technology, which injects identification codes into the recorded material, the passive approach uses characteristics or features of the recording itself to distinguish it from other possible audio or video inputs. While both methods have their advantages, passive approaches are most appropriate for copyright management and monitoring. There are several reasons for this. First, coded identification signals that are added to the audio or video material in active systems are frequently detectable to the discerning eye or ear. When the code injection level is reduced to the point that it is invisible or inaudible, the reliability of the code recovery suffers. Further, the injected codes are often destroyed by broadcast processing or signal processing necessary to distribute audio and video on computer networks. However, the most important shortcoming of the active technologies is that there are millions of works in distribution that have not been watermarked. This material cannot be protected; only new releases that have been processed to inject codes can be detected automatically using active techniques.

In contrast, passive pattern recognition systems learn the distinctive characteristics of each work. During a training procedure, works that are to be identified are analyzed and features of the audio and video (or both) are processed into templates to be recognized later. Unknown input signals are then analyzed and compared with the features of each known pattern. When the properties of the unknown audio or video signal match one of the template sets stored in a database, the unknown input is declared to match the work that was used to produce the corresponding templates. This is analogous to fingerprint or DNA matching. By properly selecting the features of the audio or video that are used to construct the stored templates this process can be extremely reliable, even in cases where the signal has been significantly degraded and distorted. The system can of course learn to recognize any work, old or new.

In most implementations of passive signal recognition technology, the templates stored in the database are derived from a single time interval of a recording that may range from several seconds to a minute in duration. The system then monitors each input cannel continuously, searching for a match with one of the templates in the database. In this configuration the system has only learned a small piece of each work that it must recognize. As the system searches for audio or video pattern matches on its input channels it must repeatedly acquire signal segments and compare them with database entries. The system must continuously monitor each of its input channels. Otherwise, a time segment that matches one of the database templates could occur when the system is not monitoring a particular channel.

A system based on the present invention is designed differently. Instead of learning a single time segment from each audio or video work, all of the time segments comprising each work are learned. While this increases the size of the pattern database, the size is not unreasonable. Signal recognition is accomplished from a single input signal segment. Once an input segment has been captured, it is compared with all stored templates from all monitored works. The signal input stream appearing at a particular input port can then be switched to a different channel. This multiplexing or channel hopping can be done without fear of missing a detection so long as the system revisits each channel within the duration of a particular work. If a segment is missed because the system is observing a different channel, the audio or video work will be identified by matching a later time segment when the system switches back to the proper channel. This procedure is analogous to what a human observer might do if he were to try to keep track of the program content of many television channels using a single receiver. Assuming that the observer knew all of the programs that could possibly be transmitted, he could identify the program on one channel or information stream and then switch to a different channel and identify that program as well. This procedure can be repeated for many channels or Internet virtual channels without risk that a program will be missed.

The present signal recognition method is also able to identify brief clips or excerpts from registered programming. Further, since the system has learned the entire program it is able to determine the point in time in the program from which the excerpt was extracted. This information can be used to determine whether a program has been transmitted in its entirety or if it has been edited to remove certain portions. The system architecture is also capable of detecting programs that have been constructed by splicing together portions of several other copyright protected works. Again, since the system will know all of the available programming it is able to indicate which time intervals of each original work have been extracted to produce a new program. Similarly, if insertions have been made into a program for advertisements or other breaks in continuity, this can be detected by measuring the time intervals between program segments.

The system architecture is a distributed network of specially equipped computers. This network can grow in a uniform way to expand the number of monitored channels or the number of audio or video signals to be identified. Signal sources include Internet distribution of audio and video recordings, satellite downlinks that are used for broadcast feeds, or direct terrestrial and satellite distribution to consumers. Regardless of the signal source, the pattern recognition processes involved are the same. Separate interfaces can be provided between these signal sources and the signal recognition system. The design of the system supports growth and reconfiguration to support changing needs.

One of the initial applications of the subject program identification system is to monitor computer network distribution of copyright protected audio and video material. These sources would include music and video on demand services and real-time Internet broadcast of audio and video. The result of this monitoring is a set of files that indicate which sites are transmitting specific titles. This information can then be cross-indexed to determine which sites are licensed to transmit these specific works. In cases where there is an apparent copyright infringement, the appropriate rights organization can be notified so that royalties can be collected in accordance with copyright laws and international agreements.

The present invention requires an initialization or registration process to produce templates of works that are later to be identified. In this process, audio and video signals are digitized and processed to extract sequences of important features. For audio signals these features may be measurements of energy present in different portions of the audio spectrum. Video signals may be characterized by measurements of the intensity, color, texture, etc. taken from different regions of the viewing area. In both the audio and video cases, sequences of these measurements constitute time series data streams that indicate the dynamic structure of the signal. For the purposes of this invention the audio and video features are treated identically, allowing the most descriptive features to be used to construct the templates. The multiple feature streams are then broken into overlapping time intervals or segments of several seconds each that cover the entire work. The audio and/or video features from each segment are then analyzed to determine which features carry the most descriptive information about the segment. Features are then rank ordered according to their information content, and the best features are selected to construct a template of a particular segment. Note that each segment may use a different subset of available features, and they may be ordered differently within each segment. The features are then normalized and fast Fourier transformed to produce complex spectra that facilitate fast feature correlation. In addition, each feature is correlated with a large number of similar features stored in the pattern library. This allows us to estimate the standard deviation of correlation values when the segment is not present in the input stream. From this we can predict the probability that a particular peak correlation value occurred randomly. The rank ordered features, normalization factors, and feature standard deviations are stored as structured records within a database entry representing the entire work.

The signal recognition process operates on unknown audio and video signals by extracting features in the same manner as was done in the initialization process. However, instead of capturing the entire work, it is only necessary to acquire a single snapshot or time interval equal in duration to that of a template segment. All available features are computed from the unknown input segment. For each time segment of each pattern in the database the most descriptive feature is correlated with the corresponding feature measurement from the unknown input signal. Based on the peak value of the correlation function and the standard deviation of background correlations computed during initialization, an estimate is made of the probability that the correlation occurred randomly. If the probability is low enough, the pattern is placed on a candidate list. Patterns on the candidate list are then further evaluated by correlating the next most valuable feature of each pattern segment on the candidate list with the corresponding features of the unknown input. The probability of random (false) correlation is then estimated for this feature as well. Assuming statistical independence of the two feature correlations, the probability that the two events happened randomly is the product of the individual probabilities. This process is repeated using additional features until the probability that a detection event occurred at random is low enough that there is confidence that the detection is legitimate. Patterns on the candidate list that exceed the probability of false detection threshold are deleted. This iterative process of evaluating additional features results in a drastic reduction in the computational load. For example, assume that for each feature correlation only five percent of the candidate patterns produce false alarm probabilities below the threshold for further consideration. Then 95% of the candidates will be disregarded on each feature correlation pass. If we use four features, the total number of correlations $N_c$ that must be computed is $$N_c = (1 + 0.05 + (0.05)_2 + (0.05)^3) * N_p$$

where $N_p$ is the total number of patterns in the database. In this case $N_c = 1.052625 * N_p$. The use of four features requires only slightly more computation than a single feature. By comparison, if this iterative rejection of candidates was not used $N_c = 4 * N_p$ correlations would have been required. The savings in computation is substantial, and increases as more features are used. This allows the system to search for more patterns or to monitor more channels using the same computational resources.

The sampling strategy employed involves selecting the time between samples in accordance with the duration of each individual work. The system must search for brief advertisements or jingles almost continuously. However, the system can search for longer duration works such as movies or television programs much less frequently, perhaps every few minutes. The required sampling interval for each pattern is stored in the pattern database. An intelligent scheduling algorithm then determines which patterns to correlate on each update cycle. The scheduler also tracks sequential time segments of works that have been detected. Once a work has been identified the pattern recognition process can be focused on the expectation that the next time segment of that work will appear on a particular channel. As long as this expectation is met there is no need to commit computing resources to the consideration of any other candidate patterns. In this situation the system operates in a tracking mode instead of a search mode. The system can then apply the correlator computing resources to other input channels. The scheduler thus has the capability of greatly increasing the capacity of the system.

3. Pattern Recognition Algorithm Description

The pattern recognition algorithm is based on computing cross correlation functions between feature time series data extracted from the input signal and reference patterns or templates derived from the signal to be identified. The performance of the correlation function is determined by the amount of information contained in the pattern. If there is too little information in the pattern, it will have a high false alarm rate due to random correlations exceeding the detection threshold. If there is too much information in the pattern, small variations or distortions of the input signal will degrade the value of the correlation peak causing detections to be missed. For our purposes the information content of a pattern is equal to its time-bandwidth product. We have found that a time-bandwidth product of 80-100 provides low false alarm rates while still being tolerant of distortion typical in a broadcast environment. A pattern duration of 10 seconds would therefore need a bandwidth of 8-10 Hz to produce the desired performance. This bandwidth can be from a single information stream or from several separate streams with less bandwidth, provided that the individual streams are statistically independent. Similarly, one can use several time segments of low bandwidth to produce the needed time bandwidth product.

The correlation function or matched filter response can be implemented in the time domain by integrating the products of time series samples of the template and a corresponding number of samples of the unknown input series and then properly normalizing the result. However, the process must be repeated for each time delay value to be evaluated. The computational load is not acceptable. A better technique known as fast convolution is used that is based on the fast Fourier transform algorithm. Instead of directly computing each correlation value, an entire block of correlation values is computed as the inverse Fourier transform of the cross-power spectrum of the template time series and a block of input data samples. The result must be normalized by the product of the standard deviations of the input and the template. Furthermore, if correlations are to be computed continuously the template or reference pattern must be padded with zeros to double its length and the input data must be blocked into double length buffers. This process is repeated using overlapped segments of the input data and evaluating the values of the first half of the resulting correlation function buffers. This method requires that the input stream be monitored continuously. Any occurrence of the reference pattern in the input stream will be detected in real time.

The method used in the present invention is a variation of the fast correlation approach where the roles of template and input data are reversed. In this approach a sequence of overlapped data buffers are acquired from the entire audio or video time series to be recognized during the initialization process. A set of templates is then created as the fast Fourier transform of the normalized data buffers. As is well known in signal recognition technology, a post correlation normalization is required to adjust for the signal power present in the portion of the template where the input block occurs. To accomplish this a set of RMS amplitude values is computed for each of the possible time delays. These values are computed and stored in the pattern data structure during initialization.

In the recognition process a block of feature data is acquired from the input stream and normalized to a fixed total power. It is then zero filled to double its length and Fourier transformed to produce a complex spectrum. The input spectrum is then vector multiplied by each of the template spectra. The resulting cross power spectra are then inverse Fourier transformed to produce a set of correlation functions. These raw correlation functions are then normalized by dividing each value in the correlation by the corresponding RMS value stored in the pattern data structure. The correlation values range from 1.0 for a perfect match to 0.0 for no match to −1.0 for an exact opposite. Further, the mean value of these correlations will always be 0.0. By computing correlation functions for multiple features and combining them according to their statistical properties we have devised an efficient and accurate method of recognizing multivariate time series waveforms. Note that in this algorithm it is only necessary to acquire a single block of input data. Continuous monitoring is not required, allowing the receiver to be switched to a different channel. Further, since we know which template of the set produced the detection, we know how much time is remaining in the detected audio or video. This information can be used in scheduling when to revisit a particular channel.

The method of the present invention uses multiple feature streams extracted from the audio, video or both. This allows the template generation and the recognition process to be tailored to the most distinctive aspects of each recording. In addition, the pattern recognition process is staged to conserve processing capacity. In this approach, an initial classification is performed using only one or two features. For each feature correlation that is evaluated within a particular time segment the system estimates the probability that such an event could occur randomly. Candidate patterns with a low probability of random occurrence are examined further computing the correlation with an additional feature. Correlation peaks are matched within a time window and the probability that the new feature correlation occurred randomly is estimated. The system then computes the probability of simultaneous random correlation as the product of the individual probabilities (assuming statistical independence). If this joint probability is below a predetermined detection threshold, it is determined that the event represents a valid recognition and a detection is logged. If the joint probability is above a separate predetermined rejection threshold, the event is deemed to be a false alarm and the pattern is no longer considered a candidate for recognition. Otherwise an additional feature correlation is computed and the joint probability is updated to include the new feature information. This process is repeated until a decision has been made or all features have been evaluated. The basis for relating correlation values to probabilities is the standard deviation of feature correlations between pattern templates and a large database of similar features extracted from different works. This is performed during initialization of each work. Since these correlations have approximately a normal distribution, the cumulative distribution function can be used to estimate the probability that a particular correlation value occurred randomly.

The implementation of the pattern recognition algorithm is intended for use in a channel hopping environment. A set of computer controlled receivers can be used to monitor many channels by using appropriate scheduling. The recognition process does not need to run in real time. Feature blocks can be tagged with their channel number and time and stored for later processing. However, real time detection data is useful for scheduling channel selections.

4. Pattern Database Organization

The pattern recognition system is driven to a large degree by the structure of the pattern database. In order to support a variety of operational modes and signal types, a pattern data structure has been devised that is hierarchical and self descriptive. As mentioned previously, we believe that the best pattern recognition approach is to recognize a single sample of the incoming signal by comparing it with all samples of a particular audio or video recording. When any segment of a recording is recognized, a detection is declared and logged, and an input port can be released to search other channels.

Similarly, if none of the pattern segments comprising a recording are identified, one can be assured that the recording is not present and the system can switch to a different channel to acquire a sample. Continuous monitoring of each channel is not required It is only necessary to revisit each channel at an interval shorter than the recording. This is particularly important in cases where, for example, a two hour movie can be identified from a sample that is only a few seconds in duration.

Since the system must be capable of identifying audio, video, or a combination of the two a generalized representation of feature streams has been devised that allows the most effective features to be used for each segment. Other segments of the same recording may use completely different feature sets.

One aspect that is common to all features is that they are represented as a time series of measurements of certain characteristics of the audio and video. Examples of these measurements are energy in a particular audio band, intensity, color, and to texture (spatial frequency) of a region of the video.

A reference pattern is structured as a three layer hierarchy. At the top level the pattern identification code and pattern type are indicated in the first two words. The third word indicates the number of time segments in the pattern. Next is a list of pointers to segment descriptor blocks followed by a checksum to assure block integrity.

Each segment descriptor block carries forward the pattern identification code and the pattern type as the first two words in the block header. Next is the segment number indicating which time interval is represented. The fourth word indicates the number of features in the current segment block. Next is a list of pointers to feature data blocks followed by a checksum.

The third level in the hierarchy is the feature data block level. In addition to header information these blocks actually contain pattern feature data. The first three words carry the pattern identification code, pattern type and the segment number as was the case in the segment descriptor block. The fourth word in the feature data block indicates the feature type. The feature type word is used to select which feature stream from the input is to be compared with this block. Next is a scale factor that is used to adjust the relative gain among features to maintain precision. This is necessary since the feature time series data are normalized to preserve dynamic range. The standard deviation of background (false alarm) correlations is stored along with detection and rejection probability thresholds. Next in the feature data block is a frequency domain matched filter derived from the normalized feature data. The feature normalization array is stored next in compressed form. At the end of the block is a checksum, again to assure data structure integrity.

In addition to the signal feature data structures that are stored in the reference pattern database are a set of structures that provide information about the work itself such as the name, type, author, and publisher of each work and various industry standard identification codes such as ISWC, ISRC, and ISCI. Also included in this structure are the media source type, work duration, and the date and time of pattern initialization. These structures are indexed by the same Pattern ID code used to reference the signal feature data structures. The work description data are used in report generation to provide information that is useful to users.

5. The Structure

The structure of an automatic signal recognition system according to the present invention is shown in FIG. 1. This audio and video recognition station preferably comprises one or more Audio/Video Interface Subsystems 1 which accept input signals that are to be identified from various sources. Each subsystem processes audio and video signals and extracts important characteristics (known as features) from these signals. Many signal sources can be processed simultaneously in each of these subsystems, and many interface subsystems can be included in the system structure to accommodate any number of input channels. For example, in a large city, enough interface subsystems may be provided to monitor all broadcast and cable TV stations, and all AM and FM radio stations within that city. Internet host sites can be monitored from anywhere in the world.

The Audio/Video Interface Subsystem 1 operates under the command of the Search Robot and Scheduler Subsystem 5. The Scheduler determines which of the input sources (e.g., TV station) needs to be sampled at which (or any) point in time to acquire feature packets for identification. This allows sharing of input channels among a larger number of signal sources (channel hopping) according to whether the program material from a particular source has already been identified. The feature packets produced by the Audio/Video Interface Subsystems (to be described in more detail below) contain low bandwidth time series waveforms of all available measurements of the source (audio, video, or both). Note that in addition to the direct media source inputs, signals are also collected from sources such as the Internet 7 to support monitoring of virtual broadcasts and digital downloads.

The feature packets are then transmitted over the local network to the Pattern Recognition Subsystems 2. These subsystems each compare the unknown feature packets with reference patterns from a portion of the Master Pattern Database 4 in a manner to be described below. The processing capacity of each Pattern Recognition Subsystem is large but limited. To achieve real-time recognition of a virtually unlimited number of works, the Pattern Recognition Subsystems are replicated as needed to achieve the required capacity. The detection results from each Pattern Recognition Subsystem 2 are transmitted over the local area network to a Management Database System 6 that records which works are transmitted on each source at various points in time. This information is used to produce reports and is also used by the Search Robot and Scheduler 5 to plan which sources should be sampled next by the Audio/Video Interface Subsystems 1.

The Pattern Initialization Subsystems 3 accept audio and video works that are to be stored in the Master Pattern Database 4. These subsystems perform feature extraction (to be described below) in the same manner as in the real-time input processing. However, instead of constructing brief packets of features for identification (as is done with the real time input signals), the Initialization Subsystems 3 extract continuous feature waveforms from the entire work. The feature waveforms are then broken into overlapping time-series segments and processed to determine which features should be stored for signal recognition and in what order. The resulting rank-ordered reference pattern data structures are stored in the Master Pattern Database 4. These patterns are subsequently transferred to the Pattern Recognition Subsystems 2 for comparison with the unknown input feature packets.

6. Feature Extraction

The Audio/Video Interface Subsystem 1 comprises a host microcomputer and a plurality of specialized signal processor circuit boards that perform the actual feature extraction. The audio interface and signal processor according to the preferred according to the preferred embodiment is illustrated in FIG. 2. In this example, up to 64 audio sources can be monitored, but only eight can be simultaneously processed. Audio Input Source Select Multiplexers 8 select among several audio sources for each channel. These source selectors are switched at a low speed as directed by the Scheduler 5. The outputs of each Source Select Multiplexer 8 is connected to an analog Antialias Lowpass Filter 9 to restrict the maximum audio frequency (to 3.2 kHz in this example). The outputs of these filters are connected to a Channel Multiplexer 10 that rapidly scans the filter outputs. In this example with eight channels sampled at 8 kHz each, the Channel Multiplexer 10 switches at a 64 kHz rate. The Channel Multiplexer output is connected to an Analog to Digital Converter 11 that operates at the aggregate sample rate producing a multiplexed time series of the selected sources. The output of the Analog to Digital Converter 11 is transmitted to a programmable Digital Signal Processor 12 that performs the digital processing of the audio time series waveforms to extract features and construct the feature packets that are to be recognized. Digital Signal Processor 12 is a special purpose microprocessor that is optimized for signal processing applications. It is connected to a Program Memory 14 where programs and constants are stored and a Data Memory 13 for storage of variables and data arrays. The Digital Signal Processor 12 also connects to the Host Computer Bus 16 using an interface such as the PCI Bus Interface 15 for exchange of data between the Digital Signal Processor and the host computer.

The audio signal processing necessary to perform the feature extraction is performed in software or firmware installed on Digital Signal Processor 12 as depicted in FIG. 3. Digitized audio samples from one of the signal sources are grouped into a Sample Set 17 and merged with one or more Previous Sample Sets 18 to form a window into the audio time series for periodic spectral analysis. The size of this window determines the spectral resolution while the size of the new Sample Set 17 determines the interval between updates. Once a block of data has been prepared for analysis, it is multiplied by a function such as a Hanning Window 19 to reduce the spectral leakage due to so called end-effects caused by finite block size. The resultant time series is then processed by a fast Fourier transform (FFT) 20 to produce the complex spectrum. The Power Spectrum 21 is then calculated from the complex spectrum by summing the squares of the real and imaginary components of each frequency bin. An example of the resulting audio Power Spectrum 21 is shown in FIG. 4. This figure also indicates the partitioning of the spectrum into several frequency bands. The total power in each of the frequency bands is found by integrating the power contained in all of the frequency bins in the respective bands as shown in 22. Each time the above processes are performed, a new set of feature measurements generated. In most cases the update rate will still be much higher than desired from the point of view of feature bandwidth and the resulting data rate. For his reason, the sample rate is reduced by processing each frequency band feature sequence by a Polyphase Decimating Lowpass Filter 23. In the preferred embodiment of the invention this results in an audio feature sample rate of approximately 10 Hz.

In the preferred embodiment of the invention, video signals go through a different set of steps to achieve feature extraction, but the resulting feature time series waveforms are virtually identical. FIG. 5 is an illustration of the video interface and signal processing components that perform these functions. Analog video sources can be chosen one at a time by the Video Input Source Select Multiplexer 24 as directed by the Search Robot and Scheduler Subsystem 5. The selected video signal is directed to a Video Antialias Lowpass Filter 25 to avoid distortion of the video signal. Since the system must accept a number of different video formats with varying bandwidth, the cutoff frequency of this filter is programmable. The output of this filter is fed to a high speed Analog to Digital Converter 26 with a programmable sample frequency to support different video formats. The video time series from the Analog to Digital Converter 26 is fed to both a Horizontal/Vertical Frame Synchronizer 27 and a Video Frame Generator 28. The Frame Synchronizer 27 identifies horizontal synchronization pulses and vertical retrace intervals in the video signal and uses these to reset the horizontal and vertical address counters that define a raster scanned image. These counters are contained in the Video Frame Generator 28 along with spatial averaging circuits that sum several adjacent rows and columns of video pixels from the Analog to Digital Converter 26. This produces a raster image with relatively low resolution. Digital video signals can also be acquired from a Digital Video Interface 29 that receives its inputs from either an external digital video source or from the PCI Bus Interface 33 that connects to the host microprocessor Computer Bus 35. Regardless of the signal source, Video Frame Generator 28 produces a sequence of video frames in a standardized format of approximately 160 by 120 pixels. These video frames are transferred sequentially to a set of dual ported Video Frame Buffer Memories 30. These memories also connect to a Digital Signal Processor 32 where further spatial and temporal processing is performed. Also connected to Digital Signal Processor 32 are a DSP Program Memory 34 and a DSP Data Memory 31. The signal processor also connects to the Host Computer Bus 35 via PCI Bus Interface 33.

The operations performed by Digital Signal Processor 32 to extract video features are illustrated in FIG. 6. To begin the process we get the Next Frame 36 from a Video Frame Buffer Memory 30 and extract Intensity, Color, or Texture 37 from each pixel in the video frame. A two-dimensional Spatial Weighting Function 38 then multiplies each region of the video frame. An example of this weighting function is shown in FIG. 8. The approximate positions of the regions within the video frame are shown in FIG. 7. Note that the positions of these regions have been selected to allow feature extraction from either 4:3 or 16:9 aspect ratio video formats. After weighting the pixels in each region, we Integrate Over Each Region 39 by summing all of the weighted pixels in each region. Next the DSP 32 Samples Each Region 40 producing a set of feature measurements, one per region. In the example shown in FIG. 7, there are 13 feature measurements in each frame. The next step is to Construct a Time Series for Each Region 41. A set of Polyphase Decimating Filters is then applied to each feature time series to reduce the sample rate of each video feature to the same rate as the audio. In the preferred embodiment of the invention this is approximately 10 Hz. The audio and video processing boards and feature extraction processes are identical in both the Audio/Video Interface Subsystems 1 and the Pattern Initialization Subsystems 3.

FIG. 9 is an example of a set of feature waveforms extracted from an audio signal. If this had been a video only signal, there would be 13 separate features. In the typical television signal case, a total of 19 feature waveforms are present in the preferred embodiment of the invention. In the case of the real-time signal recognition process, a set of 64 consecutive samples is collected from each feature waveform to construct recognition feature packets. In constructing reference patterns, each feature waveform is broken into segments that are 128 samples long and are overlapped by 64 samples. This ensures that an unknown input sample feature packet will be completely contained in at least one of the feature reference segments. The overlapping segmentation of a single feature is illustrated in FIG. 10. This segmentation is applied to all available features.

7. Reference Pattern Generation

The procedure for generating reference patterns is illustrated in FIG. 11. For each feature of each segment, the feature waveform is first block-scaled to a fixed total power. This assures that the precision and dynamic range of the signal processing is preserved. The scale factor used in this scaling is saved. Next the fast Fourier transform (FFT) of the feature waveform is computed, yielding the complex spectrum that is used in the fast correlation algorithm. A sliding standard deviation (RMS) of the feature waveform is also computed for use in properly normalizing the correlation functions. In the preferred embodiment of the invention the standard deviation is calculated for each of 64 positions within a 128-sample segment using a window that is 64 samples long. Once all features of all segments have been processed as described above, the information content of each feature from each segment is measured.

The measure of information content used in the preferred embodiment in the degree of spectral dispersion of energy in the power spectrum of each feature. This can be statistically estimated from the second moment of the power spectrum. Features with widely dispersed energy have more complex structure and are therefore more distinctive in their ability to discriminate among different patterns. The features within each segment are then rank-ordered by their information content so that the most useful features will be used first in the pattern recognition process. Features with too little information to be useful are deleted from the reference pattern data structure. Next, the detection parameters are computed. Each feature is correlated with a large number of pattern samples that do not match the pattern under consideration. The statistical distribution that results characterizes the false alarm behavior of the feature. Acceptable detection and rejection probabilities are then computed from the joint probability of false alarm. These are stored as detection and rejection thresholds to be used in the pattern recognition process.

The reference pattern database structure of the preferred embodiment is illustrated in FIG. 12. This structure contains two types of information, both of which are indexed by a unique Pattern Identification Code 43. The first is a descriptive data record 45 that contains administrative information such as the name, type, author, and publisher of the work. Also included are various industry standard identification codes and data that describe the source media and initialization time and date. The pattern identification code is also included in this record to allow cross-checking the database.

The second part of the database is a hierarchical set of data structures that contain the reference pattern data itself plus the information needed to process the data. At the top of this hierarchy is the Pattern Descriptor Block 44. This block contains the pattern identification code to allow integrity checking of the database and the pattern type (audio, video, mixed, etc.). Next is a number that indicates the number of segments in the pattern and a set of pointers to Segment Descriptor Blocks 46. A checksum may also be included to verify the integrity of the block. The Segment Descriptor Blocks contain the pattern identification code, pattern type and segment number to verify the integrity of the data structures. Next are the number of features, a list of pointers to feature blocks, and an optional checksum. Each Feature Block 47 contains the pattern identification code, pattern type (audio, video, mixed, etc.), segment number, and feature type (audio, video, etc.). Next is the scale factor that was used to block scale the feature waveform during initialization followed by the standard deviation of background (false) correlations that was computed from the false alarm correlation distribution. The detection and rejection probability thresholds are included next. These are used to determine whether a detection can be confirmed, false alarm can be confirmed, or if another feature must be evaluated in order to decide. The complex spectrum of the feature data is included next, followed by the sliding standard deviation (RMS) of the feature waveform that is used to normalize the raw correlation functions. A checksum may also be included.

8. Pattern Recognition

During the pattern recognition process, the performance and capacity of the system can be enhanced by using information regarding prior detections and by knowing the duration of each work to be identified. In the preferred embodiment of the invention this is done by the Search Robot and Scheduler 5. The search robot function is primarily used to identify new sources of audio and video and to examine Internet download sites that distribute audio and video recordings. The operation of the Input Channel and Pattern Scheduler is shown in FIG. 13. It should be noted that FIG. 13 illustrates the operation of a single channel and the acquisition of signal samples for identification. The system performs these functions on many channels simultaneously and allocates resources among the channels as needed. The first decision pertains to whether the content of the present channel has been identified during a previous update cycle. If the content of the channel has been identified, the channel can be removed from the schedule for the remaining duration of the detected recording. A different channel can then be selected. If the contents of the channel are not known, the system must acquire a new input sample block. The reference patterns stored on the Pattern Recognition Subsystems 2 are organized in several lists depending on their duration. Works or recordings that are relatively short must be checked on every update cycle to ensure that they are not missed. Typically, these works are 10 to 15 seconds in duration, and are usually jingles and advertisements. The next list contains patterns of medium duration, where the definition of medium duration is subjective. However, for illustrative purposes we will specify that the shortest work on this list is 120 seconds. If the feature sample block size has a duration of 6 seconds, the system must check each pattern every 20 blocks. In this example of the preferred embodiment the system will process five percent of the medium duration pattern list on each update cycle. Similarly, long duration patterns are checked even less frequently. These patterns might be derived from television programs or movies. For purposes of illustration we can select patterns with a minimum duration of 20 minutes to be members of the long list. For a sample block duration of 6 seconds, the system need only check the list every 200 blocks. In this example of the preferred embodiment the system only needs to process one-half of one percent on each update cycle to ensure that a work will not be missed. Upon completion recognition of patterns from all of these lists, detection results are reported and the next input channel is selected. Note that three lists of patterns have been discussed for illustrative purposes. It should be clear that the number of lists of patterns used in the preferred embodiment can be matched to the distribution of pattern durations that are actually in use. In addition, it is possible to further reduce the number of patterns that must be evaluated by restricting the individual patterns only to channels where they may be expected to appear. For example, we would not expect to find television programs or movies broadcast on radio stations, so the system can skip these patterns when evaluating radio broadcasts.

FIG. 14 identifies the steps that are necessary to prepare a new input feature block for pattern recognition. The raw input feature set comprises a set of time series waveforms representing audio and/or video signals. First, the mean value of each feature is removed. Next, each feature in the input block is normalized by dividing each feature data value by the standard deviation calculated over the entire block. Each normalized feature time series is then padded with zeros to double its duration. This is a desirable step in the fast correlation process to prevent circular time wrapping of data values from distorting correlation values. The fast Fourier transform (FFT) of each feature is then computed, producing a complex spectrum.

The pattern recognition process employed in the preferred embodiment of the invention are illustrated in FIG. 15. When a new input feature block is acquired it is compared with candidate patterns on one or more of the reference pattern lists. After initializing this list to access the next pattern to be evaluated the first feature is selected from both the unknown input and the reference pattern. The cross-correlation function is then computed. The correlation function has a value of one for a perfect match, zero for no correlation, and negative one for a perfect anti-correlation. The maximum value of the correlation function is then found. This correlation peak value is then divided by the standard deviation of background (false) correlations that was found in the initialization process to yield the number of standard deviations from the mean value of zero. Using Gaussian statistics we can estimate the probability that this event occurred randomly (a false alarm). The process is repeated for subsequent features at the same instant of time. The resulting probabilities of false alarm for the individual features are multiplied to produce a composite false alarm probability. The composite probability of false alarm (PFA) is then compared with an upper limit. If the composite PFA exceeds this limit, the candidate detection is deemed to be a false alarm and the pattern is rejected. Otherwise the composite PFA is compared with a lower limit. If the composite PFA is less than the lower limit, the probability that the event is due to random events is deemed to be sufficiently low that the event must be a legitimate pattern recognition. The detection event is then logged along with the time and date of its occurrence and the channel number or source. Additional information regarding the remaining time in the recording is passed to the scheduler to allow it to make more efficient scheduling plans. If the composite PFA is above the lower limit and is below the upper limit, the cause of the event is still uncertain and requires the use of additional information from other features. This process of correlating, estimating individual feature PFA's, updating the composite PFA and evaluating the composite PFA is repeated until a decision can be made. Note that a new pair of PFA limits is used each time that a new feature is added. In addition, the upper and lower PFA limits for the last available feature are set to be equal to force a decision to be made. The above processes are repeated for all time segments of all patterns on the candidate pattern list. This could result in simultaneous detections of two or more patterns. If such simultaneous detections occur, this could indicate that one work or recording is a composite of other initialized works.

FIG. 16 illustrates the steps in performing the fast correlation algorithm using the complex spectra of the feature waveforms from the unknown input and an initialized reference pattern from the database. These spectra are first multiplied to produce the complex cross-power spectrum. The inverse fast Fourier transform is then applied to the cross-spectrum to obtain a raw correlation function. The first half of this correlation function is then normalized by the sliding standard deviation (RMS) previously computed during initialization and stored in the feature structure of the pattern database. The second half of the correlation function represents circularly time-wrapped values that are discarded. An example of a properly normalized feature correlation is shown in FIG. 17.

FIG. 18 illustrates how false detection probabilities can be estimated from the feature correlation values and the standard deviation of background (false) correlations calculated during initialization. It has been found that the distribution of random correlations is approximately normal resulting in a probability density function resembling FIG. 18A. In the preferred embodiment of the invention, the correlation values are divided by the standard deviation of background correlations. This yields the number of standard deviations from the expected value. The cumulative distribution function shown in FIG. 18B indicates the probability that a correlation value expressed in standard deviations will encompass all legitimate detections. For example, if the standard deviation of background correlations was found to be 0.3 during initialization and we compute a correlation value of 0.6 during pattern recognition, the correlation value is 2 standard deviations above the expected (mean) value for all correlations. From FIG. 18B we surmise that this correlation value is greater than 97.7 percent of all randomly occurring correlation values. The probability that a random correlation will exceed this value is therefore only 2.3 percent. This is illustrated in FIG. 18C where we define the probability of false alarm for an individual feature to be PFA=1−cdf((correlation peak)/sigma). In the preferred embodiment of the invention these probabilities are stored in a table for rapid lookup. Assuming statistical independence of the features, the probability that simultaneous false detections of features will occur is simply the product of the individual probabilities of false alarm.

The teachings of this patent describe a methodology and a system to automatically recognize audio and video performances in an accurate and efficient manner. Those skilled in the art will recognize that there are many obvious variations of the methodology and system structure that are also within the scope of these teachings and the appended claims.

What is claimed is:

1. Apparatus for recognizing an input data stream, comprising:
    a receiver for receiving the input data stream;
    an interface for randomly selecting any one portion of the received data stream, and forming a plurality of feature time series waveforms respectively corresponding to distinct portions of the received data stream;
    a memory for storing a plurality of feature distinctiveness maps of stored candidate patterns; and
    processor structure for: (i) computing distinctiveness of each feature of the input stream and constructing a map of the rank ordering of said distinctiveness, (ii) computing a distance metric between the input feature distinctiveness map and the plurality of feature distinctiveness maps of stored candidate patterns, (iii) correlating the plurality of feature time series waveforms with the plurality of feature distinctiveness maps of stored candidate patterns in an order determined by the computed distance metrics, (iv) designating a recognition when a feature correlation joint probability between the plurality of feature time series waveforms and at least one of the plurality of feature distinctiveness maps of stored candidate patterns reaches a predetermined value, and outputting a recognition signal after the feature correlation joint probability reaches the predetermined value.

2. The apparatus of claim 1, wherein said feature correlation probability is expressed as an odds ratio.

3. The apparatus of claim 1 where said feature correlation probability is expressed as an odds ratio and iteratively updated by multiplying said odds ratios before converting back to a probability representation.

4. Apparatus for forming features from an input data stream, comprising:
   a receiver for receiving the input data stream and extracting a plurality of feature time series waveforms; and
   processor structure for (i) determining the information content of each feature from each of a plurality of time interval segments of the feature time series waveforms, (ii) rank-ordering each of the features of each of the time interval segments according to their information content, and (iii) constructing a map of feature distinctiveness rankings; and
   a memory for storing the constructed feature distinctiveness maps for each of the time interval segments.

5. A processor-implemented method for recognizing an input data stream, comprising the steps of:
   receiving the input data stream;
   randomly selecting any one time interval from the received data stream;
   forming a first plurality of feature time series waveforms respectively corresponding to distinct portions of the received data stream;
   rank ordering features of the first plurality of waveforms according to distinctiveness of their information content and constructing corresponding feature distinctiveness maps;
   retrieving from a storage device a second plurality of feature time series waveforms and their predetermined feature distinctiveness maps;
   computing a distance measure between the first feature distinctiveness map and each of the second plurality of feature distinctiveness maps, using a processor;
   constructing a list of second plurality of feature time series waveforms corresponding to the smallest distances between first feature distinctiveness map and each of the second feature distinctiveness maps;
   correlating the first plurality of feature time series waveforms with the second plurality of feature time series waveforms in an order corresponding to (i) the list of candidate patterns from the second plurality of feature time series waveforms having the smallest distances between the distinctiveness map of the first plurality of feature time series waveforms, and (ii) the distinctiveness maps of the second plurality of feature time series waveforms; and
   designating a recognition when a joint correlation probability value between the first plurality of feature time series waveforms and at least one of the second plurality of feature time series waveforms reaches a predetermined value.

6. The method of claim 5, wherein said joint correlation probability value is expressed as an odds ratio.

7. The method of claim 5 where said joint correlation probability value is expressed as an odds ratio and iteratively updated by multiplying said odds ratios before converting back to a probability representation.

8. A processor-implemented method for forming feature waveforms from an input data stream comprising the steps of:
   receiving the input data stream and separating the input data stream into a plurality of different feature waveforms;
   determining the most distinctive feature information from each of a plurality of time interval segments, utilizing a processor;
   rank-ordering features of the time interval segments according to their distinctiveness; and
   storing in a storage device a map corresponding to the rank-ordered features.

9. A computer readable storage device for storing a program which causes one or more computers to recognize an input data stream, the stored program causing the one or more computers to:
   receive the input data stream;
   randomly select any time interval of the received data stream;
   form a first plurality of feature time series waveforms from the received data stream which respectively correspond to distinct portions of the received data stream;
   store a second plurality of feature time series waveforms;
   compute the distinctiveness of each feature of the input stream and constructing a map of the rank ordering;
   compute a distance metric between the input feature distinctiveness map and the second plurality of feature distinctiveness maps of stored candidate patterns;
   correlate the first plurality of feature time series waveforms with the second plurality of feature time series waveforms in an order determined by the distance metric between (i) a the feature distinctiveness map of the input data stream and (ii) the feature distinctiveness maps of the second plurality of feature time series waveforms; and
   designate a recognition when a joint correlation probability value between the first plurality of the feature time series waveforms and at least one of the second plurality of feature time series waveforms reaches a predetermined value.

10. The storage device of claim 9, wherein said joint correlation probability value is expressed as an odds ratio.

11. The storage device of claim 9, where said joint correlation probability value is expressed as an odds ratio and iteratively updated by multiplying said odds ratios before converting back to a probability representation.

12. A processor-implemented method of using recognition features from an input data stream to achieve automatic signal identification, comprising the steps of:
   receiving the input data stream;
   forming a plurality of time series waveforms which correspond to all features of the received input data stream;
   forming multiple feature streams from the plurality of feature time series waveforms;
   correlating, using a processor, the most distinctive features of plural stored candidate patterns with the multiple feature streams formed from the input data stream in an order corresponding to a map of candidate patterns that best match the rank ordering of the plurality of feature time series waveforms, said stored candidate patterns being stored in a memory device; and designating recognition of the input data stream when a joint probability of correlations between the input data stream and at least one of the stored candidate patterns indicates that random detection is not probable.

13. The method of claim 12, wherein said joint probability of correlations is expressed as an odds ratio.

14. The method of claim 12, wherein candidate patterns are discarded if their maps do not substantially match the rank ordering of the input features.

15. A processor-implemented method of using recognition features from an input data stream to achieve automatic signal identification comprising the steps of:

receiving the input data stream;

forming a plurality of feature time series waveforms which correspond to features of the received input data stream;

forming multiple feature streams from the plurality of feature time series waveforms;

rank-ordering the features streams according to their distinctiveness;

constructing a map of the feature distinctiveness rankings, and storing said map in a storage medium;

computing a distance metric between the input feature distinctiveness map and each of the maps corresponding to plural stored candidate patterns, utilizing a processor;

correlating the most distinctive features of the plural stored candidate patterns with the multiple feature streams formed from the input data stream in an order corresponding to the distance metric between the input feature distinctiveness map and the maps of candidate patterns of the plurality of feature time series waveforms; and designating recognition of the input data stream when a joint probability of correlations between the input data stream and at least one of the stored candidate patterns indicates that random detection is not probable.

16. The method of claim 15, wherein said joint probability of correlations is expressed as an odds ratio and iteratively updated by multiplying said odds ratios before converting back to a probability representation.

17. The method of claim 15, wherein candidate patterns are discarded if their feature distinctiveness maps do not adequately match the distinctiveness maps of the input features.

* * * * *